(12) United States Patent
Suzuki et al.

(10) Patent No.: US 8,237,594 B2
(45) Date of Patent: Aug. 7, 2012

(54) ENCODING APPARATUS, DECODING APPARATUS, INFORMATION PROCESSING SYSTEM, AND COMPUTER-READABLE STORAGE MEDIUM

(75) Inventors: Shiro Suzuki, Kanagawa (JP); Yuuki Matsumura, Saitama (JP); Yasuhiro Toguri, Kanagawa (JP); Yuuji Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 12/871,493

(22) Filed: Aug. 30, 2010

(65) Prior Publication Data

US 2011/0084858 A1  Apr. 14, 2011

(30) Foreign Application Priority Data

Oct. 9, 2009  (JP) ............................... P2009-234692

(51) Int. Cl.
*H03M 7/40* (2006.01)
(52) U.S. Cl. ........................... 341/67; 704/229; 382/234
(58) Field of Classification Search .............. 341/50–70; 704/229; 382/234, 246
See application file for complete search history.

(56) References Cited

U.S. PATENT DOCUMENTS

| | | | | |
|---|---|---|---|---|
| 5,623,557 | A * | 4/1997 | Shimoyoshi et al. | 382/246 |
| 5,761,342 | A * | 6/1998 | Yoshida | 382/234 |
| 5,825,310 | A * | 10/1998 | Tsutsui | 341/51 |
| 5,905,502 | A * | 5/1999 | Deering | 345/420 |
| 5,930,750 | A * | 7/1999 | Tsutsui | 704/229 |
| 6,199,038 | B1 * | 3/2001 | Tsutsui | 704/229 |
| 6,604,069 | B1 * | 8/2003 | Tsutsui | 704/200.1 |

FOREIGN PATENT DOCUMENTS

JP          07-212243          8/1995

* cited by examiner

*Primary Examiner* — Lam T Mai
(74) *Attorney, Agent, or Firm* — Finnegan, Henderson, Farabow, Garrett & Dunner, L.L.P.

(57) ABSTRACT

An encoding apparatus includes a unit that calculates a plurality of normalized values by dividing input values in an input signal by either a normalization coefficient that is closest to a maximum value of absolute values of the input values or a normalization coefficient that is closest to the maximum value from among normalization coefficients that are larger than the maximum value; a unit that generates a plurality of quantized values by quantizing the plurality of normalized values; a unit that stores a code table in which the smaller the probability of occurrence of the plurality of quantized values, the longer the code length of a variable-length code allocated to the plurality of quantized values; and a unit that outputs, when the plurality of quantized values are all zero, a variable-length code allocated to a combination of a plurality of quantized values in accordance with the code table.

20 Claims, 15 Drawing Sheets

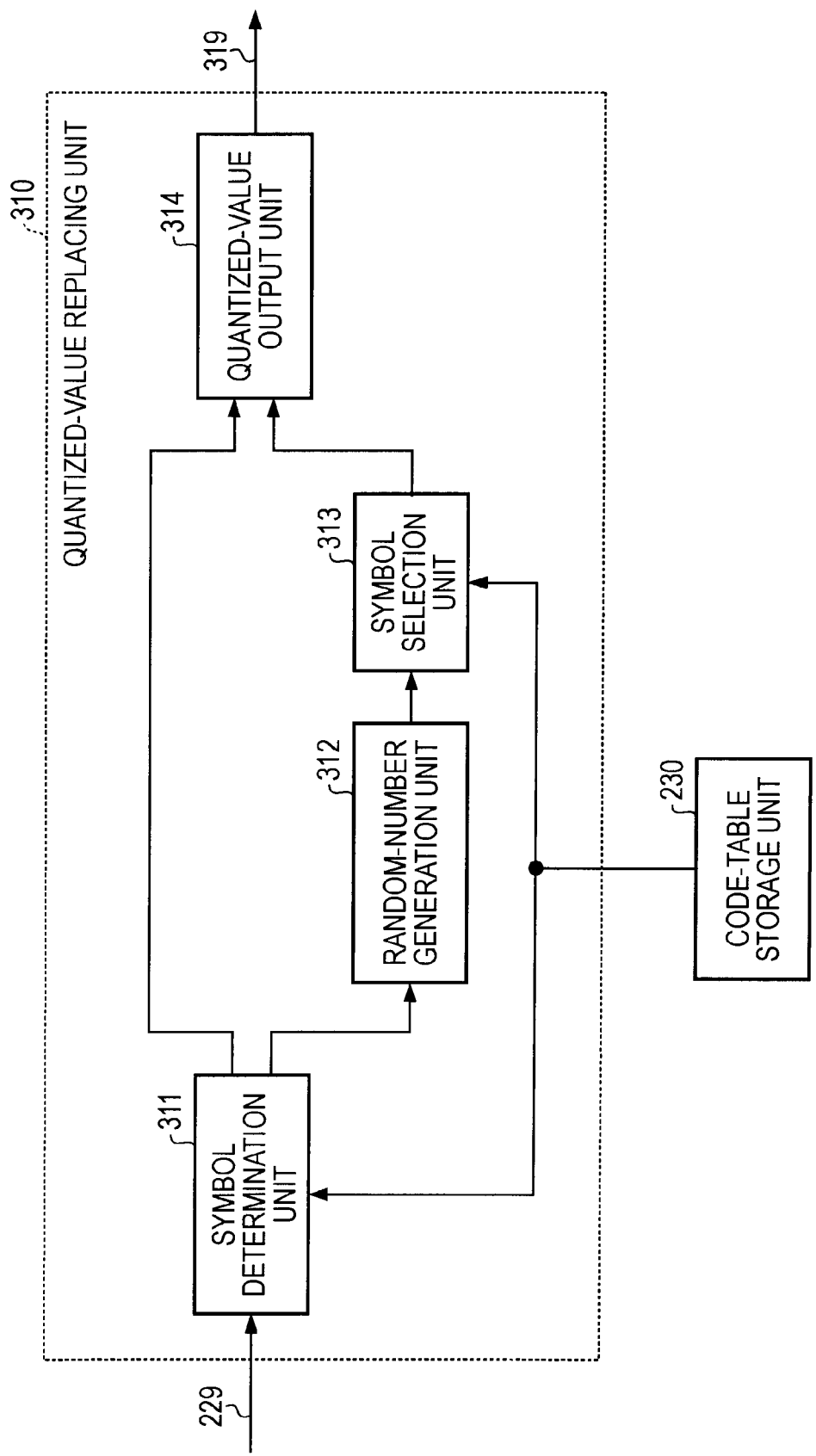

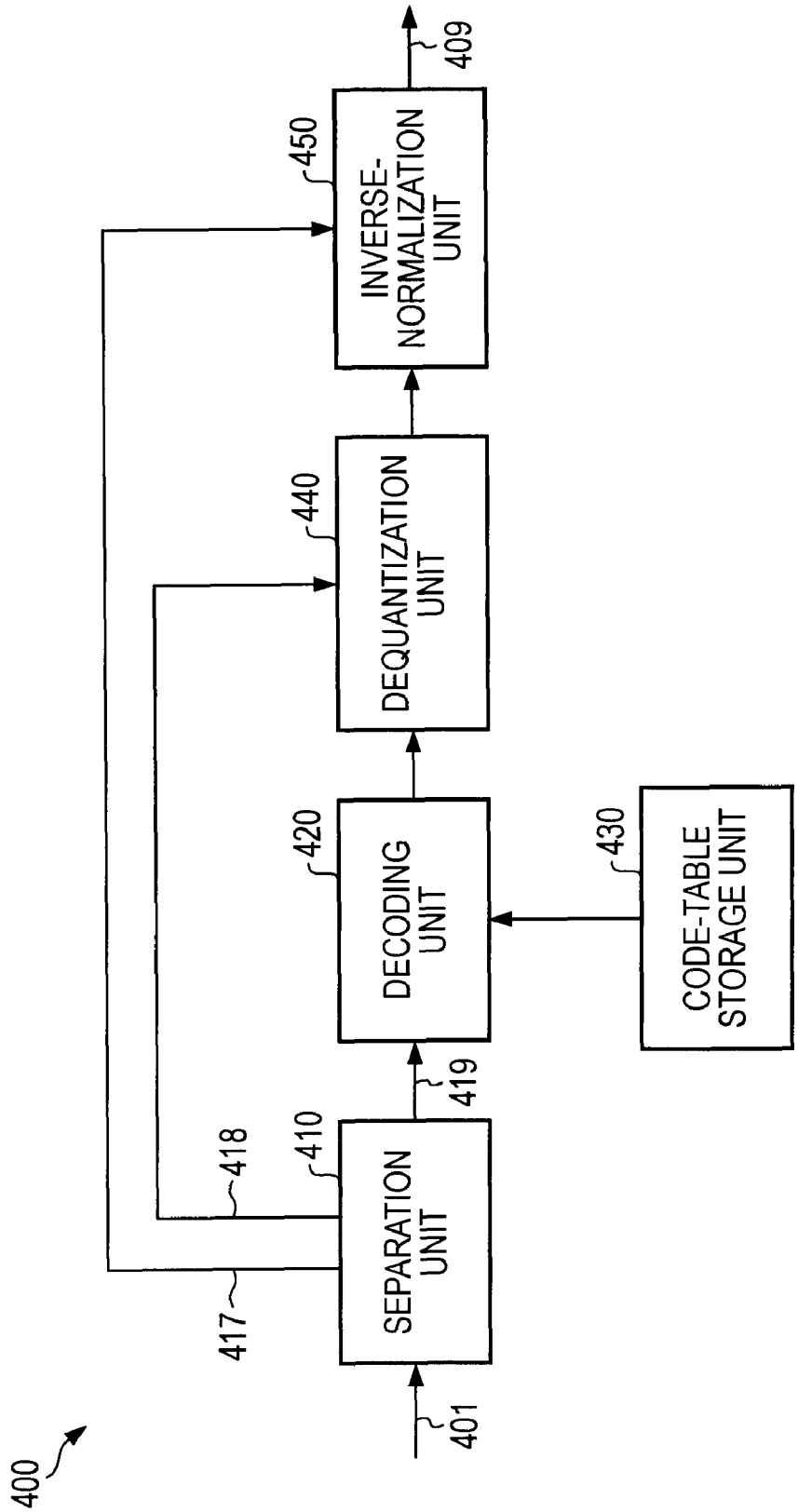

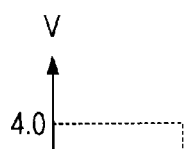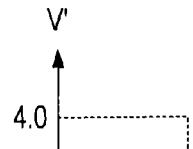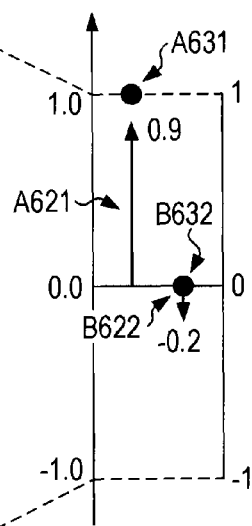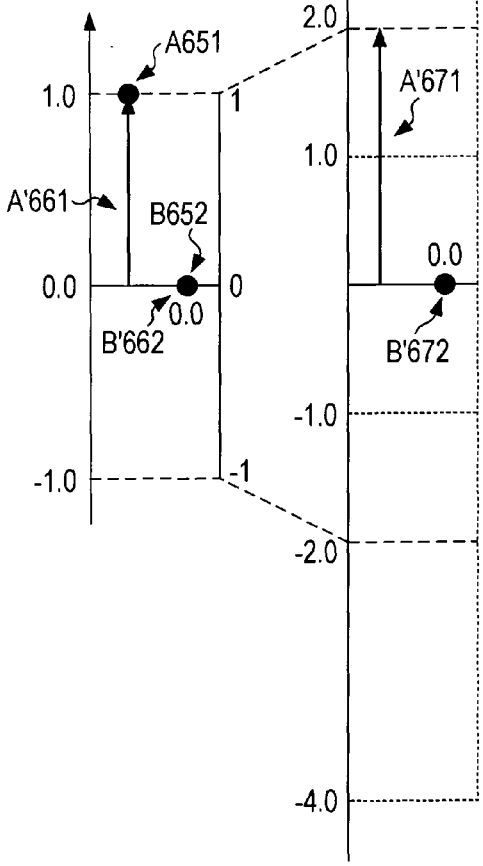

FIG. 7

| | 842 | 843 | 844 | 845 |
|---|---|---|---|---|
| | SYMBOL | CODE | CODE LENGTH (NUMBER OF BITS) | FREQUENCY OF OCCURRENCE |
| | S1 | 01 | 2 | 8 |
| | S2 | 10 | 2 | 8 |
| | S3 | 001 | 3 | 4 |
| | S4 | 110 | 3 | 4 |
| | S5 | 0000 | 4 | 2 |
| | S6 | 0001 | 4 | 2 |
| | S7 | 1110 | 4 | 2 |
| | S8 | 11110 | 5 | 2 |
| | S9 | 11111 | 5 | 1 |

FIG. 9

| SYMBOL | CODE | CODE LENGTH (NUMBER OF BITS) | FREQUENCY OF OCCURRENCE |
|---|---|---|---|
| S1 | 01 | 2 | 8 |
| S2 | 10 | 2 | 8 |
| S3 | 001 | 3 | 4 |
| S4 | 110 | 3 | 4 |
| S5 | 0000 | 4 | 2 |
| S6 | 0001 | 4 | 2 |
| S7 | 1110 | 4 | 2 |
| S8 | 1111 | 4 | 2 |

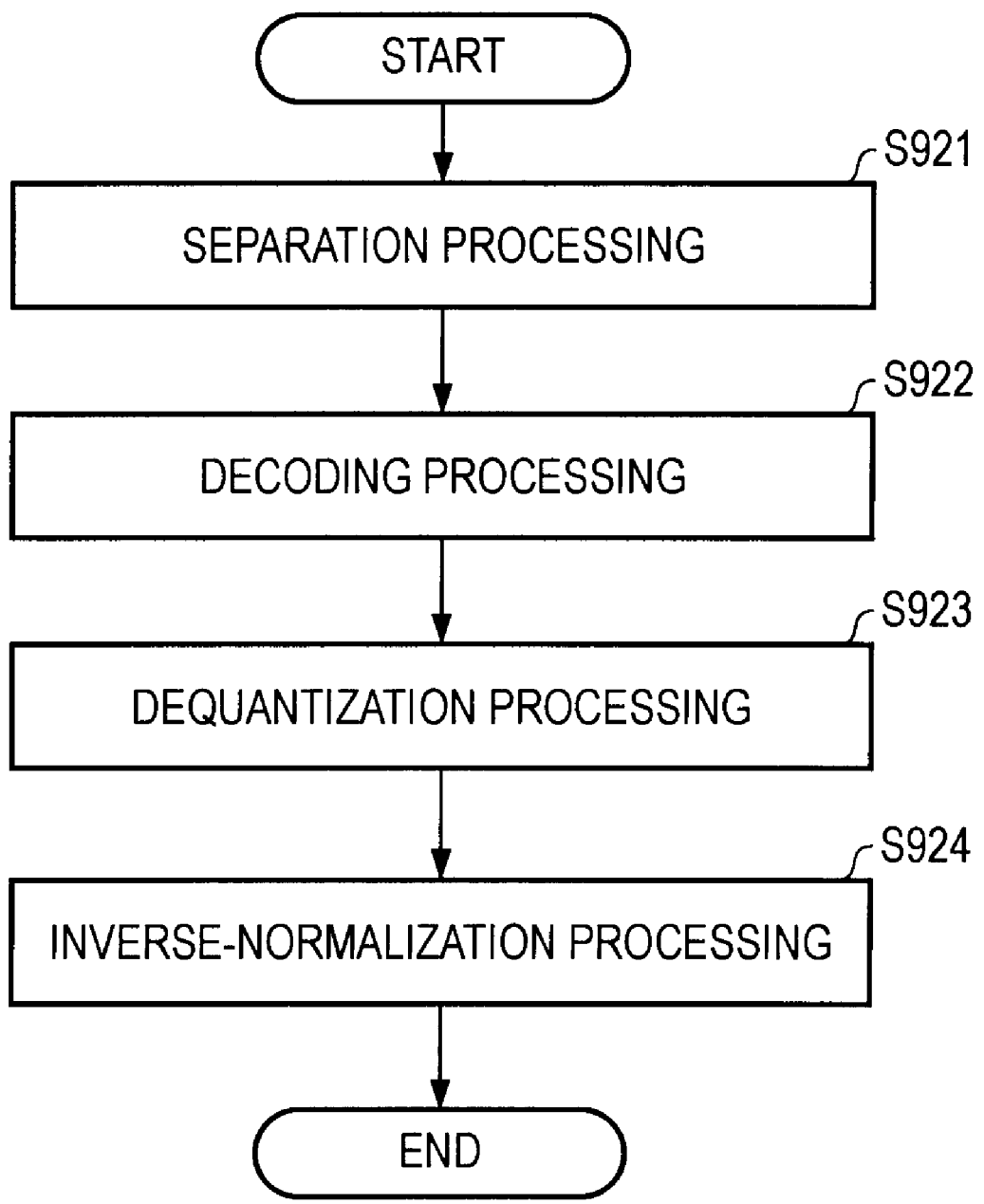

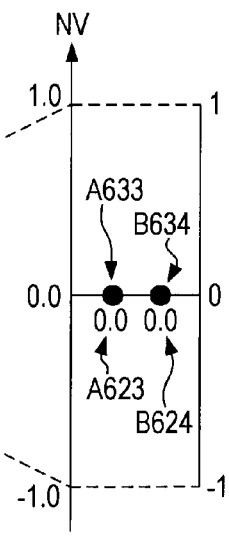
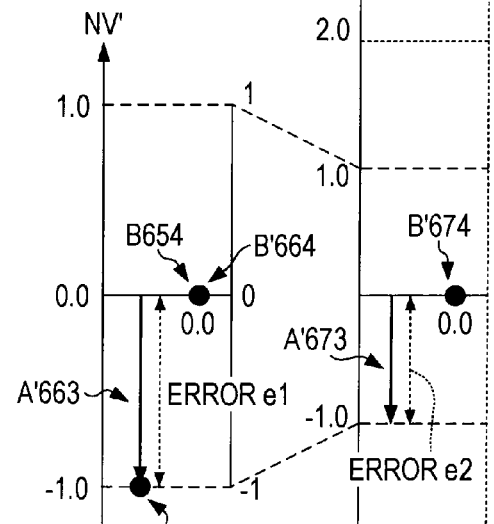
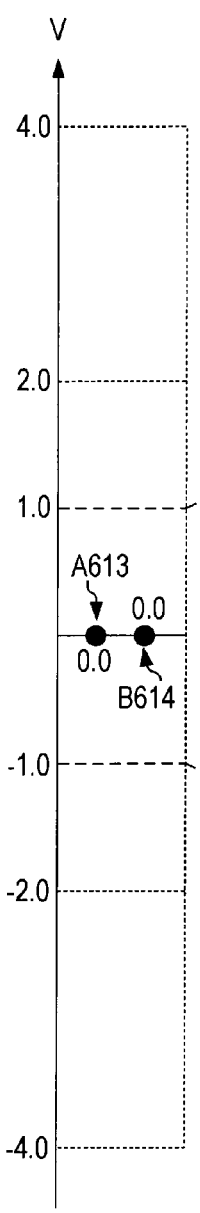
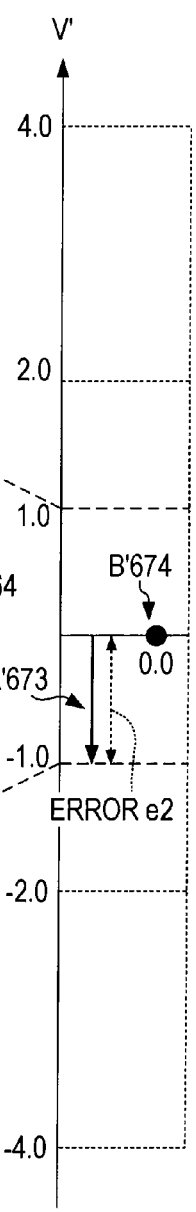

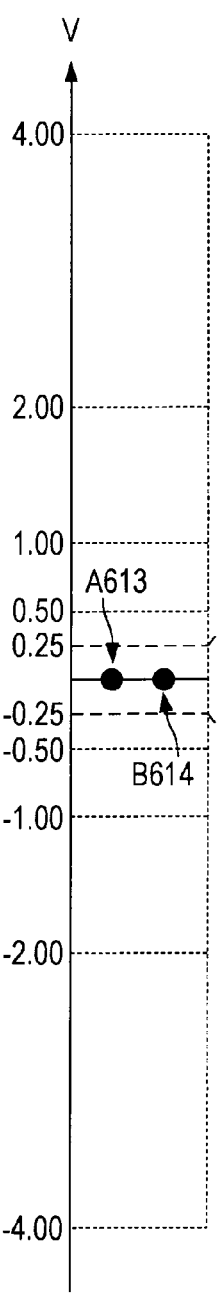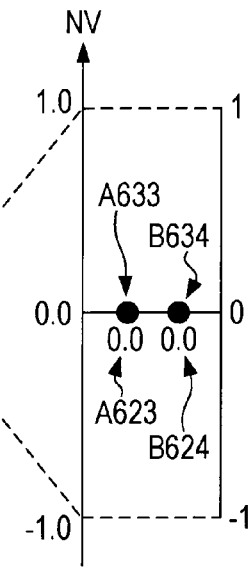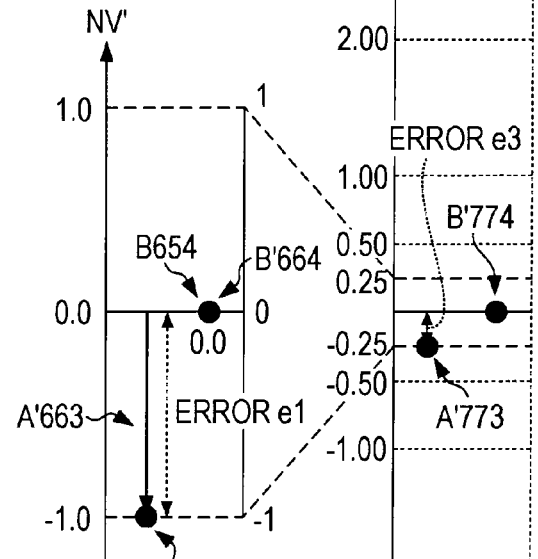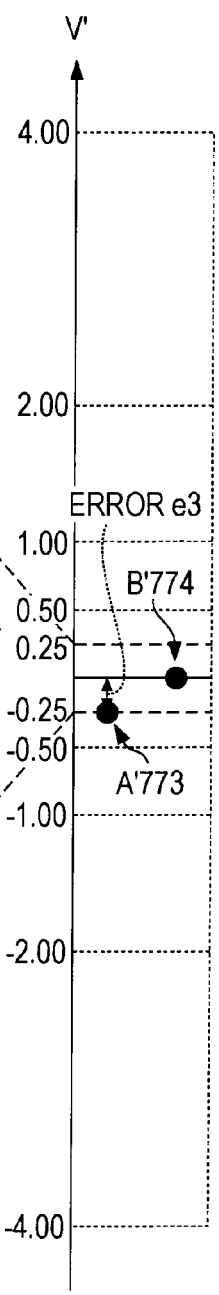

ENCODING APPARATUS, DECODING APPARATUS, INFORMATION PROCESSING SYSTEM, AND COMPUTER-READABLE STORAGE MEDIUM

BACKGROUND OF THE INVENTION

1. Field of the Invention

The present invention relates to an information processing system, and more particularly to an encoding apparatus that performs encoding by using a variable-length code, a decoding apparatus corresponding to the encoding apparatus, an encoding processing method, and a program that causes a computer to execute the encoding processing method.

2. Description of the Related Art

There are many encoding apparatuses that compress information such as images and audio by encoding the information. For example, an encoding apparatus that encodes quantized data by referring to a Huffman code table generated in accordance with, for example, the frequencies of occurrence corresponding to the probabilities of occurrence of pieces of quantized data has been proposed (for example, see Japanese Unexamined Patent Application Publication No. 07-212243 (FIG. 1)).

SUMMARY OF THE INVENTION

In the above-described existing technology, pieces of quantized data are encoded by referring to the Huffman code table generated in accordance with the frequencies of occurrence of the pieces of quantized data, and thus the pieces of the encoded quantized data can be compressed. In such an encoding apparatus, the smaller the frequency of occurrence of a symbol corresponding to a piece of quantized data to which a code is to be allocated, the longer the code length of a code allocated to the symbol. Thus, there may be a case in which the coding efficiency may be lowered because a long code length corresponding to the frequency of occurrence is allocated to a symbol whose frequency of occurrence is significantly low.

It is desirable to increase the coding efficiency by excluding a symbol whose frequency of occurrence is low from targets to be encoded.

According to an embodiment of the present invention, there are provided an encoding apparatus, a processing method for the encoding apparatus, and a program that causes a computer to execute the processing method, the encoding apparatus including a normalization unit that calculates a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value; a quantization unit that generates a plurality of quantized values by quantizing the plurality of normalized values; a code-table storage unit that stores a code table in which the smaller the probability of occurrence of the plurality of quantized values, the longer the code length of a variable-length code allocated to the plurality of quantized values; and a code output unit that outputs, when the plurality of quantized values are all zero, a variable-length code allocated to a combination of a plurality of quantized values, which are different from the plurality of the quantized values, in accordance with the code table. When a plurality of quantized values, which are a unit of encoding, are all zero, the encoding apparatus, the processing method, and the program work to output, in accordance with a code table, a variable-length code allocated to a combination of a plurality of quantized values, which are different from the plurality of quantized values.

Moreover, according to the embodiment of the present invention, when the plurality of quantized values are all zero, the code output unit may output, in accordance with the code table, a variable-length code corresponding to a plurality of quantized values in which only one quantized value is nonzero, from among combinations of a plurality of quantized values included in the code table. Thus, when a plurality of quantized values are all zero, the code output unit works to output, in accordance with the code table, a variable-length code corresponding to a plurality of quantized values in which only one quantized value is nonzero, from among combinations of a plurality of quantized values shown in the code table.

According to the embodiment of the present invention, the code output unit may include a quantized-value replacing unit that selects, when the plurality of quantized values are all zero, one of combinations of a plurality of quantized values included in the code table and replaces the plurality of quantized values with the selected combination of a plurality of quantized values, and an encoding unit that encodes the plurality of quantized values output from the quantized-value replacing unit by generating the variable-length code in accordance with the code table. Thus, the quantized-value replacing unit works to replace a plurality of quantized values that are all zero with a combination of a plurality of quantized values, the combination being randomly selected from among the combinations of a plurality of quantized values shown in the code table.

Moreover, according to the embodiment of the present invention, the code-table storage unit may store a Huffman code table as the code table. Thus, the code-table storage unit works to output a code of a Huffman code corresponding to a plurality of quantized values in accordance with the code table.

Moreover, according to the embodiment of the present invention, the normalization unit may perform division on the plurality of input values by using the normalization coefficients including a normalization coefficient that is close to zero. Thus, the normalization unit works to divide the plurality of input values by the normalization coefficient set to be close to zero.

According to another embodiment of the present invention, there is provided a decoding apparatus that includes a code-table storage unit that stores a code table in which a variable-length code corresponding to a plurality of quantized values that are all zero is not included; a decoding unit that decodes a variable-length code into the plurality of quantized values in accordance with the code table generated in accordance with the probability of occurrence of the plurality of quantized values; and an inverse-normalization unit that generates a plurality of output values, as a plurality of input values in an input signal, by using a plurality of normalized values generated by dequantizing the plurality of quantized values obtained as a result of decoding performed by the decoding unit and a normalization coefficient corresponding to the plurality of normalized values. This decoding apparatus works to decode a variable-length code into a plurality of quantized values in accordance with the code table in which a variable-length code corresponding to a plurality of quantized values that are all zero is not included.

According to another embodiment of the present invention, there is provided an information processing system that includes an encoding apparatus that includes a normalization unit that calculates a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value, a quantization unit that generates a plurality of quantized values by quantizing the plurality of normalized values, a code-table storage unit that stores a code table in which the smaller the probability of occurrence of the plurality of quantized values, the longer the code length of a variable-length code allocated to the plurality of quantized values, and a code output unit that outputs, when the plurality of the quantized values are all zero, a variable-length code allocated to a combination of a plurality of quantized values, which are different from the plurality of quantized values, in accordance with the code table; and a decoding apparatus that includes a code-table storage unit that stores a code table the same as that stored in the encoding apparatus, a decoding unit that decodes the variable-length code output from the encoding apparatus into the plurality of quantized values in accordance with the code table, and an inverse-normalization unit that generates a plurality of output values, as the plurality of input values, by using a plurality of normalized values generated by dequantizing the plurality of quantized values obtained as a result of decoding performed by the decoding unit and the normalization coefficient corresponding to the plurality of normalized values. When a plurality of quantized values, which are a unit of encoding, are all zero, this information processing system works to cause the encoding apparatus to output, in accordance with the code table, a variable-length code corresponding to a combination of a plurality of quantized values, which are different from the plurality of quantized values, and to cause the decoding apparatus to generate, as the plurality of input values, a plurality of output values obtained by decoding the variable-length code in accordance with the code table the same as that of the encoding apparatus.

Embodiments of the present invention have an advantageous effect in that the coding efficiency can be increased by excluding a symbol whose frequency of occurrence is low from targets to be encoded.

BRIEF DESCRIPTION OF THE DRAWINGS

FIG. 3 is a block diagram of an example of the structure of a quantized-value replacing unit according to the first embodiment of the present invention;

FIG. 4 is a block diagram of an example of the structure of a decoding apparatus according to the first embodiment of the present invention;

FIGS. 5A to 5E are schematic diagrams regarding an example of an operation of the information processing system according to the first embodiment of the present invention;

FIG. 7 is a diagram regarding codes of a Huffman code generated under conditions described with reference to FIGS. 6A and 6B;

FIG. 9 is a diagram regarding codes of a Huffman code generated under conditions described with reference to FIGS. 8A and 8B;

FIG. 11 is a flowchart illustrating an example of a processing procedure of a decoding method for the decoding apparatus according to the first embodiment of the present invention;

FIGS. 12A to 12E are schematic diagrams regarding an error due to replacement of a quantized value, the replacement being performed by the information processing system according to the first embodiment of the present invention;

FIGS. 13A to 13E are schematic diagrams regarding an error due to replacement of a plurality of quantized values, the replacement being performed by an information processing system according to a second embodiment of the present invention;

DESCRIPTION OF THE PREFERRED EMBODIMENTS

In the following, embodiments of the present invention (hereinafter referred to as embodiments) will be described. The description will be made in the following order.

1. First Embodiment (an example of variable-length coding in which a plurality of quantized values that are all zero are replaced)

2. Second Embodiment (an example of variable-length coding in which an error due to replacement of quantized values is reduced)

3. Third Embodiment (an example of code-table generation processing in which a Huffman code is generated in which a symbol corresponding to a plurality of quantized values that are all zero is excluded from symbols)

1. First Embodiment

Figure 1:
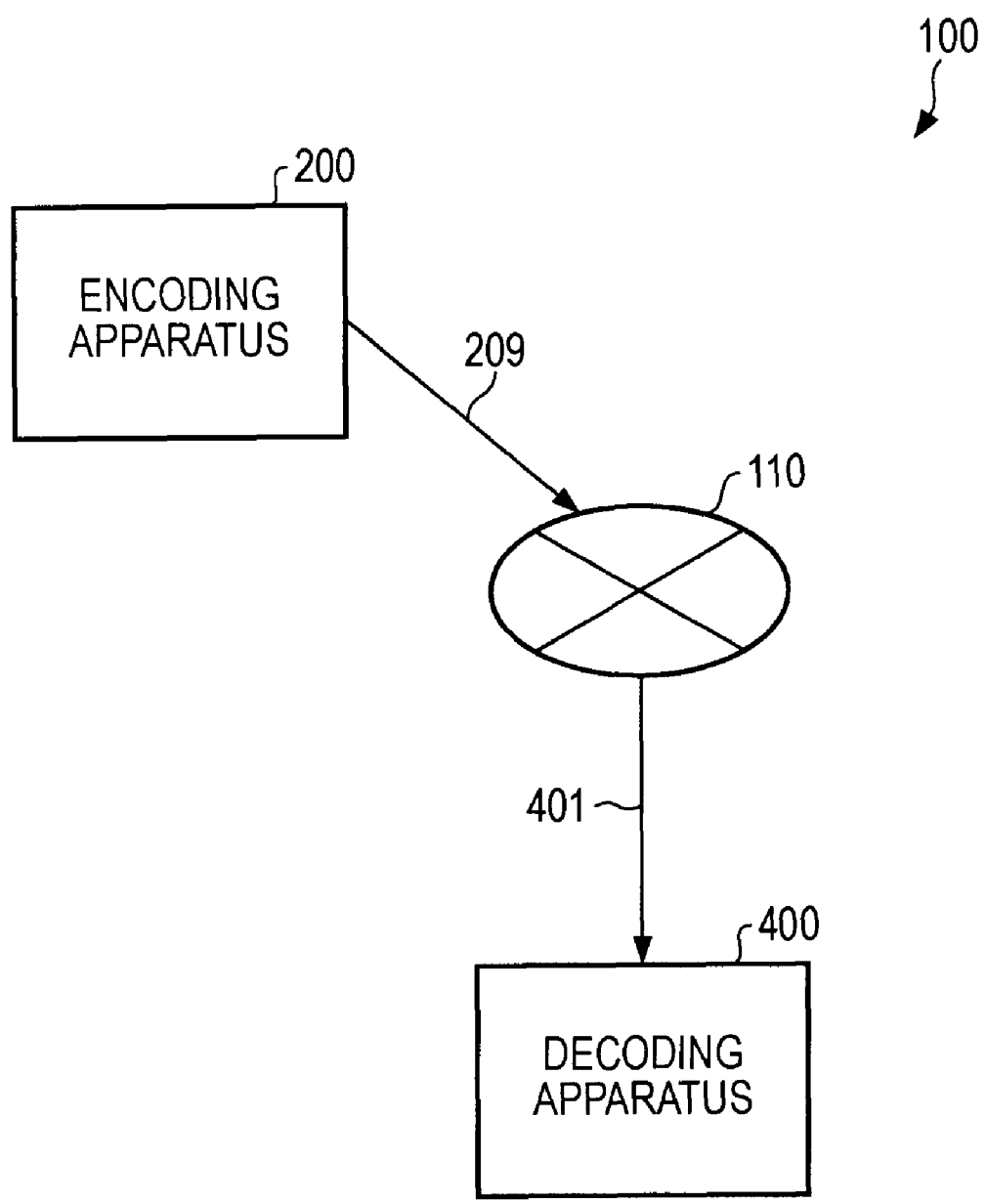
FIG. 1 is a block diagram of an example of the structure of an information processing system according to a first embodiment of the present invention.

FIG. 1 is a block diagram of an example of the structure of an information processing system 100 according to a first embodiment of the present invention. The information processing system 100 includes an encoding apparatus 200, which encodes an input signal and outputs encoded data of the input signal to a network 110, and a decoding apparatus 400, which decodes the encoded data transmitted from the network 110.

The encoding apparatus 200 generates encoded data by normalizing and quantizing input values in an input signal including information such as an image or audio and by allocating variable-length codes to the quantized values obtained as a result of the quantization. For example, the encoding apparatus 200 converts an audio signal as an input signal into frequency components, and normalizes the frequency components obtained as a result of the conversion. Then, the encoding apparatus 200 generates encoded data by quantizing the normalized frequency components and by encoding the quantized values, which are obtained as a result of the quantization, by Huffman coding.

Moreover, the encoding apparatus 200 outputs, to a code-string output line 209, a code string (a bitstream) obtained by multiplexing the encoded data by time division in order to transmit the encoded data to the decoding apparatus 400 via the network 110 in response to a request from the decoding apparatus 400. Here, the encoding apparatus 200 is an example of an encoding apparatus described in the claims.

The network 110 is a network for performing communication between the encoding apparatus 200 and the decoding apparatus 400. The network 110 transmits a code string output from the encoding apparatus 200 to the decoding apparatus 400 via a code-string input line 401.

The decoding apparatus 400 reconstructs an input signal input to the encoding apparatus 200, by decoding a code string received from the code-string input line 401. For example, the decoding apparatus 400 generates quantized values by separating a code string into encoded data and encoding information for decoding the encoded data and by decoding the encoded data. Then, the decoding apparatus 400 generates frequency components of an audio signal by dequantizing the quantized values and by performing inverse-normalization on the dequantized values, and converts the generated frequency components into a time-domain signal. Here, the decoding apparatus 400 is an example of a decoding apparatus described in the claims.

As described above, the information processing system 100 can generate encoded data, which is data obtained by compressing information regarding an input signal, by encoding the input signal by using the encoding apparatus 200. The information processing system 100 can reconstruct the input signal by decoding the encoded data by using the decoding apparatus 400.

Thus, the information processing system 100 can transmit, to the network 110, an input signal compressed by converting the input signal into encoded data, so that a load on the network 110 can be reduced. Here, the information processing system 100 is an example of a signal processing system described in the claims. Next, an example of the structure of the encoding apparatus 200 in the information processing system 100 will be described in the following with reference to FIG. 2.

Figure 2:
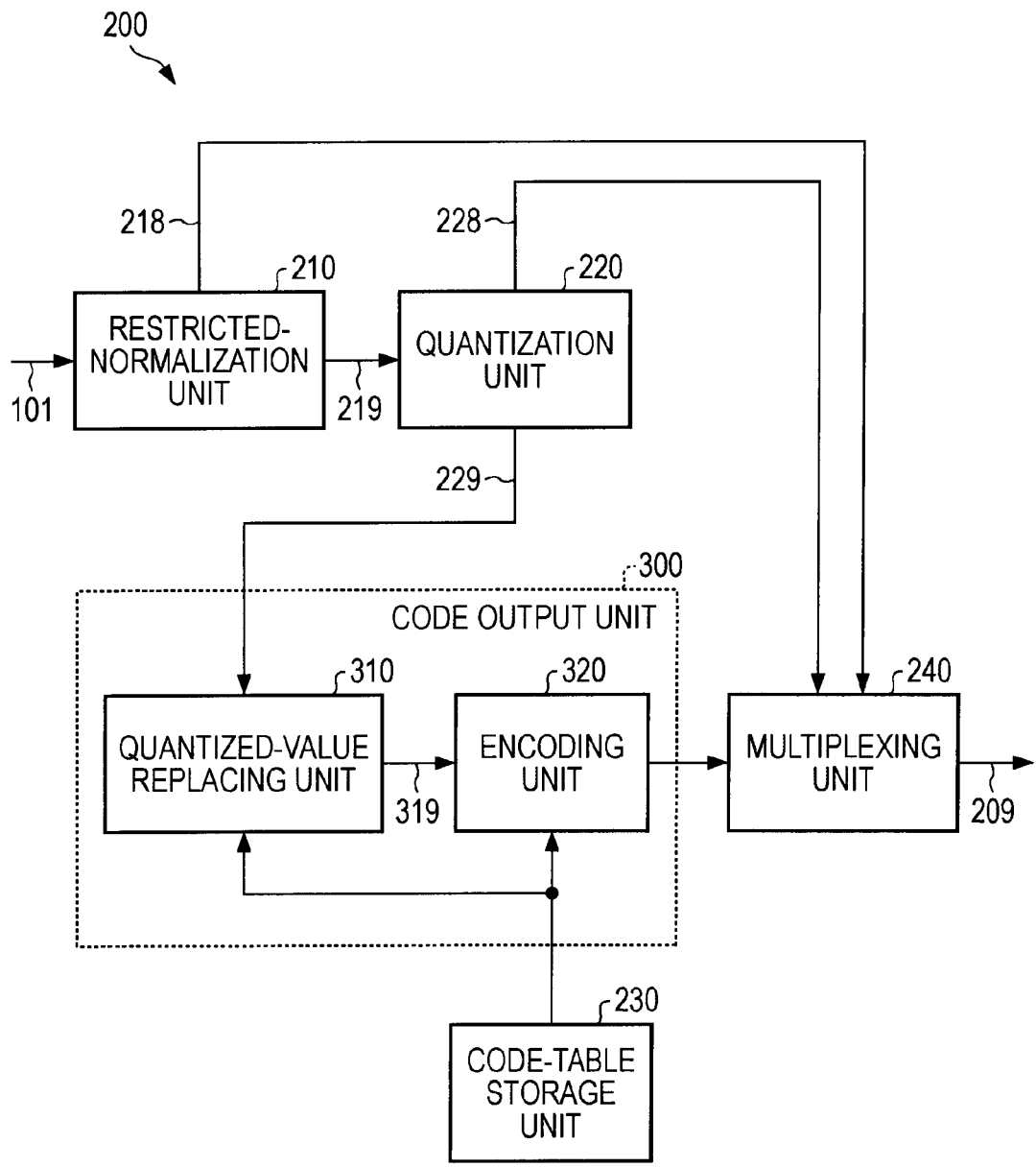
FIG. 2 is a block diagram of an example of the structure of an encoding apparatus according to the first embodiment of the present invention.

FIG. 2 is a block diagram of an example of the structure of the encoding apparatus 200 according to the first embodiment of the present invention. The encoding apparatus 200 includes a restricted-normalization unit 210, a quantization unit 220, a code-table storage unit 230, a multiplexing unit 240, and a code output unit 300. The code output unit 300 includes a quantized-value replacing unit 310 and an encoding unit 320. Here, it is assumed that frequency components of an audio signal are successively supplied via a signal line 101 as a plurality of input values in an input signal, the frequency components being obtained by dividing the frequencies of the audio signal into certain frequency ranges. Here, "a plurality of input values" means a unit of encoding, to which one code is allocated.

The restricted-normalization unit 210 normalizes, for each of certain frequency ranges, frequency components of an audio signal supplied from the signal line 101 by using a plurality of predetermined normalization coefficients, so that the restricted-normalization unit 210 calculates a plurality of normalized values for the certain frequency range. That is, the restricted-normalization unit 210 selects one normalization coefficient in accordance with the magnitudes of the absolute values of a plurality of input values, from among a predetermined number of normalization coefficients for normalizing a plurality of input values, and divides the plurality of input values by the selected normalization coefficient.

For example, the restricted-normalization unit 210 restricts, for each of the certain frequency ranges, the selection of a normalization coefficient in such a manner that only the normalization coefficient that is closest to the maximum value of the absolute values of the frequency components of the certain frequency range is selected from among a plurality of normalization coefficients. By restricting the selection of such a normalization coefficient, the probability that a plurality of quantized values become all zero can be reduced.

Moreover, for example, the restricted-normalization unit 210 restricts, for each of the certain frequency ranges, the selection of a normalization coefficient in such a manner that only the normalization coefficient that is closest to the maximum value of the absolute values of the frequency components of the certain frequency range is selected from among normalization coefficients that are larger than the maximum value. In this example, when the normalization coefficient that is closest to the maximum value of the absolute values of a plurality of input values is smaller than the maximum value, a normalization coefficient that is next to and larger than the normalization coefficient that is closest to the maximum value is selected. In this case, the probability that a plurality of quantized values become all zero can also be reduced.

Moreover, the restricted-normalization unit 210 divides the frequency components of the certain frequency range, which are the plurality of input values, by the selected normalization coefficient. Moreover, the restricted-normalization unit 210 supplies, as a plurality of normalized values, the frequency components of the certain frequency range obtained as a result of the division to the quantization unit 220 via a signal line 219. Together with these normalized values, the restricted-normalization unit 210 supplies the normalization coefficient used to perform division to the multiplexing unit 240 via a signal line 218 because the normalization coefficient is necessary when the decoding apparatus 400 performs decoding processing. Here, the restricted-normalization unit 210 is an example of a normalization unit in an information processing system and an encoding apparatus described in the claims.

The quantization unit 220 quantizes a plurality of normalized values of the certain frequency ranges supplied from the restricted-normalization unit 210. That is, the quantization unit 220 generates a plurality of quantized values, which are a unit of encoding, by quantizing a plurality of normalized values. For each of the certain frequency ranges, the quantization unit 220 converts a plurality of normalized values in the certain frequency range into discrete values in accordance with the number of quantization steps determined by using quantization accuracy information set for the certain frequency range.

Moreover, the quantization unit 220 supplies, as quantized values, discrete values obtained as a result of the conversion, which are integer values, to the quantized-value replacing unit 310 via a signal line 229. Together with these discrete values, the quantization unit 220 supplies, for each of the certain frequency ranges, quantization accuracy information, which is necessary when the decoding apparatus 400 performs decoding processing, to the multiplexing unit 240 via a signal line 228. The quantization accuracy information for one certain frequency range differs from that for another certain frequency range. Here, the quantization unit 220 is an example of a quantization unit in an information processing system and an encoding apparatus described in the claims.

The code-table storage unit 230 stores a code table in which variable-length codes are allocated to combinations of a plurality of quantized values in such a manner that the lower the probability of occurrence of a combination of a plurality of quantized values contained in a certain frequency range, the longer the code length of a variable-length code allocated to the combination of a plurality of quantized values. The code-table storage unit 230 stores, for example, a Huffman code table as a variable-length code table.

The code table stored in the code-table storage unit 230 shows codes of a Huffman code allocated to combinations of a plurality of quantized values. In this code table, any code of the Huffman code is not allocated to a plurality of quantized values that are all zero. That is, this code table does not include a code of the Huffman code corresponding to a plurality of quantized values that are all zero. Moreover, the code-table storage unit 230 outputs the stored code table to the quantized-value replacing unit 310 and the encoding unit 320. Here, the code-table storage unit 230 is an example of a code-table storage unit in an information processing system and an encoding apparatus described in the claims.

The code output unit 300 converts a plurality of quantized values supplied from the quantization unit 220 into a variable-length code in accordance with the code table stored in the code-table storage unit 230, and outputs the variable-length code obtained as a result of the conversion as encoded data. When a plurality of quantized values are all zero, the code output unit 300 outputs a variable-length code allocated to a combination of a plurality of quantized values, which are different from the plurality of quantized values, in accordance with the code table stored in the code-table storage unit 230.

Moreover, when a plurality of quantized values that are not all zero are supplied from the quantization unit 220, the code output unit 300 outputs a variable-length code corresponding to the combination of the plurality of quantized values in accordance with the code table stored in the code-table storage unit 230. Here, the code output unit 300 is an example of a code output unit described in the claims.

When a plurality of quantized values that are all zero are supplied from the quantization unit 220, the quantized-value replacing unit 310 replaces the plurality of quantized values with one of combinations of a plurality of quantized values shown in the code table stored in the code-table storage unit 230. That is, when a plurality of quantized values that are all zero are supplied, the quantized-value replacing unit 310 replaces the plurality of quantized values that are all zero with a combination of a plurality of quantized values, which are different from the plurality of quantized values that are all zero, included in the code table stored in the code-table storage unit 230.

For example, when a plurality of quantized values are all zero, the quantized-value replacing unit 310 selects one of the combinations of a plurality of quantized values included in the code table at random, and replaces the plurality of quantized values with the selected combination of a plurality of quantized values. Alternatively, for example, every time the quantized-value replacing unit 310 performs the replacement, the quantized-value replacing unit 310 performs the replacement in such a manner that a combination of a plurality of quantized values for the current replacement is different from that for the last replacement. As described above, the reason why the quantized-value replacing unit 310 is installed is that although the probability of occurrence of a plurality of quantized values that are all zero can be reduced by restricting the selection of a normalization coefficient by using the restricted-normalization unit 210, the probability of occurrence is not completely "0".

Moreover, when a combination of a plurality of quantized values, which are different from the plurality of quantized values that are all zero, is supplied from the quantization unit 220, the quantized-value replacing unit 310 simply supplies the plurality of quantized values supplied from the quantization unit 220 to the encoding unit 320. Here, the quantized-value replacing unit 310 is an example of a quantized-value replacing unit described in the claims.

The encoding unit 320 encodes a plurality of quantized values output from the quantized-value replacing unit 310 by generating a variable-length code in accordance with the code table stored in the code-table storage unit 230. That is, the encoding unit 320 generates, by referring to the code table stored in the code-table storage unit 230, a code of the Huffman code corresponding to the plurality of quantized values supplied from the quantized-value replacing unit 310. Moreover, the encoding unit 320 outputs the generated code of the Huffman code as encoded data to the multiplexing unit 240. Here, the encoding unit 320 is an example of an encoding unit described in the claims.

The multiplexing unit 240 relates encoded data supplied from the encoding unit 320, a normalization coefficient supplied from the restricted-normalization unit 210, and quantization accuracy information supplied from the quantization unit 220 to one another for each of the certain frequency ranges, and performs time division thereon to obtain one multiplexed code string. The multiplexing unit 240 outputs the multiplexed code string to the code-string output line 209.

As described above, even when the quantization unit 220 generates a plurality of quantized values that are all zero, the plurality of quantized values that are all zero can be replaced with a plurality of quantized values shown in the code table by the quantized-value replacing unit 310 installed. Hence, a plurality of quantized values that are all zero can be excluded from targets to be encoded, and thus generation of a code of a Huffman code having a long code length can be suppressed. Next, the structure of the quantized-value replacing unit 310 will be briefly described in the following with reference to FIG. 3.

FIG. 3 is a block diagram of an example of the structure of the quantized-value replacing unit 310 according to the first embodiment of the present invention. The quantized-value replacing unit 310 includes a symbol determination unit 311, a random-number generation unit 312, a symbol selection unit 313, and a quantized-value output unit 314. In this example, the code table stored in the code-table storage unit 230 is output to the symbol determination unit 311 and the symbol selection unit 313.

The symbol determination unit 311 determines whether a symbol representing a plurality of quantized values supplied from the quantization unit 220 via the signal line 229 is included in the code table stored in the code-table storage unit 230. That is, the symbol determination unit 311 determines whether the combination of the plurality of quantized values supplied from the signal line 229 is included in the combinations of a plurality of quantized values included in the code table stored in the code-table storage unit 230.

When the combination of the plurality of quantized values supplied from the signal line 229 is included in the code table, the symbol determination unit 311 simply supplies the plurality of quantized values as a symbol to the quantized-value output unit 314. In contrast, when the combination of the plurality of quantized values supplied from the signal line 229 is not included in the code table, the symbol determination unit 311 generates a random-number generation signal for generating a random number, and supplies the generated random-number generation signal to the random-number generation unit 312.

That is, when a plurality of quantized values supplied from the signal line 229 are not all zero, the symbol determination unit 311 simply outputs the plurality of quantized values to the quantized-value output unit 314. When the plurality of quantized values are all zero, the symbol determination unit 311 supplies a random-number generation signal to the random-number generation unit 312.

The random-number generation unit 312 generates a random number value, which is restricted to the number of symbols shown in the code table stored in the code-table storage unit 230, in accordance with the random-number generation signal supplied from the symbol determination unit 311. The random-number generation unit 312 outputs the generated random number value to the symbol selection unit 313.

The symbol selection unit 313 selects, in accordance with the random number value output from the random-number generation unit 312, one of a plurality of symbols, each of which corresponds to a corresponding one of the combinations of a plurality of quantized values included in the code table stored in the code-table storage unit 230. The symbol selection unit 313 prestores, for example, a correspondence table which shows a correspondence relationship between random number values and symbols, and selects a symbol corresponding to the random number value supplied from the random-number generation unit 312 in accordance with the correspondence table. Moreover, the symbol selection unit 313 outputs, to the quantized-value output unit 314, a plurality of quantized values corresponding to the selected symbol by referring to the code table stored in the code-table storage unit 230.

The quantized-value output unit 314 selects a plurality of quantized values supplied from the symbol determination unit 311 or a plurality of quantized values supplied from the symbol selection unit 313, and supplies the selected plurality of quantized values to the encoding unit 320 via the a signal line 319. When a plurality of quantized values are supplied from the symbol determination unit 311, the quantized-value output unit 314 selects the plurality of quantized values and outputs the plurality of quantized values to the signal line 319.

When a plurality of quantized values are supplied from the symbol selection unit 313, the quantized-value output unit 314 selects the plurality of quantized values and outputs the plurality of quantized values to the signal line 319. That is, the quantized-value output unit 314 outputs a plurality of quantized values, with which the combination of the plurality of quantized values supplied from the quantization unit 220 has been replaced and which are different from the combination of the plurality of quantized values supplied from the quantization unit 220, to the signal line 319.

As described above, when a plurality of quantized values are all zero, one of the combinations of a plurality of quantized values included in the code table can be selected at random by the random-number generation unit 312 installed. Thus, the quantized-value replacing unit 310 can replace a plurality of quantized values that are all zero with a combination of a plurality of quantized values selected at random. Hence, in a case in which errors caused by performing the replacement using a certain combination of a plurality of quantized values have a periodicity, the effect of noise perceptible to the human ear due to a specific frequency component included in the output signal obtained as a result of decoding performed by the decoding apparatus 400 can be reduced. Next, an example of the structure of the decoding apparatus 400, which decodes a code string generated by the encoding apparatus 200, will be described in the following with reference to FIG. 4.

FIG. 4 is a block diagram of an example of the structure of the decoding apparatus 400 according to the first embodiment of the present invention. The decoding apparatus 400 includes a separation unit 410, a decoding unit 420, a code-table storage unit 430, a dequantization unit 440, and an inverse-normalization unit 450. Here, it is assumed that a code string output from the encoding apparatus 200 via the network 110 illustrated in FIG. 1 is supplied to a code-string input line 401.

The separation unit 410 separates a code string supplied from the code-string input line 401 into encoded data, a normalization coefficient, and quantization accuracy information. Moreover, the separation unit 410 supplies the encoded data obtained as a result of the separation, to the decoding unit 420 via a signal line 419. Together with this encoded data, the separation unit 410 supplies the quantization accuracy information corresponding to the encoded data to the dequantization unit 440 via a signal line 418, and supplies the normalization coefficient corresponding to the encoded data to the inverse-normalization unit 450 via a signal line 417.

The decoding unit 420 generates a plurality of quantized values corresponding to a variable-length code, which is the encoded data supplied from the separation unit 410, by referring to the code table stored in the code-table storage unit 430. That is, the decoding unit 420 decodes the variable-length code into the plurality of quantized values in accordance with the code table generated in accordance with the probabilities of occurrence of combinations of a plurality of quantized values included in the code-table storage unit 430. Moreover, the decoding unit 420 supplies the plurality of quantized values, which are obtained as a result of decoding, to the dequantization unit 440. Here, the decoding unit 420 is an example of a decoding unit in an information processing system and a decoding apparatus described in the claims.

The code-table storage unit 430 stores a code table the same as that stored in the code-table storage unit 230 in the encoding apparatus 200 illustrated in FIG. 2. That is, the code-table storage unit 430 stores the code table in which a plurality of quantized values that are all zero are not included as a symbol. Moreover, the code-table storage unit 430 outputs the code table stored therein to the decoding unit 420. Here, the code-table storage unit 430 is an example of a code-table storage unit in an information processing system and a decoding apparatus described in the claims.

The dequantization unit 440 generates a plurality of normalized values by dequantizing a plurality of quantized values supplied from the decoding unit 420 in accordance with quantization accuracy information supplied from the signal line 418. The dequantization unit 440 supplies the generated normalized values to the inverse-normalization unit 450.

The inverse-normalization unit 450 generates a plurality of output values by performing inverse-normalization on a plurality of normalized values supplied from the dequantization unit 440, by using a normalization coefficient supplied from the signal line 417. The inverse-normalization unit 450 calculates a plurality of output values by multiplying a plurality of normalized values supplied from the dequantization unit 440 by a normalization coefficient supplied from the signal line 417. That is, the inverse-normalization unit 450 generates a plurality of output values by using a plurality of normalized values generated by dequantizing a plurality of quantized values obtained as a result of decoding performed by the decoding unit 420 and a normalization coefficient corresponding to the plurality of normalized values.

Moreover, the inverse-normalization unit 450 outputs the plurality of generated output values, as a plurality of input values in the reconstructed input signal, to a signal line 409. Then, the plurality of output values, which are in a frequency domain, output to the signal line 409 are converted into, for example, an audio signal in a time domain. Here, the inverse-normalization unit 450 is an example of an inverse-normalization unit in an information processing system and a decoding apparatus described in the claims.

As described above, the decoding apparatus 400 can obtain a reconstructed input signal from a code string generated by the encoding apparatus 200 by storing the code table the same as that stored in the code-table storage unit 230 included in the encoding apparatus 200. Next, an overview of an operation of the information processing system 100 will be described in the following with reference to FIGS. 5A to 5E.

FIGS. 5A to 5E are schematic diagrams regarding an example of an operation of the information processing system 100 according to the first embodiment of the present invention. FIGS. 5A and 5B are schematic diagrams of an example in which two input values supplied from the signal line 101 are normalized and quantized in the encoding apparatus 200. FIG. 5C is a diagram of symbols in the code table stored in the code-table storage units 230 and 430. FIGS. 5D and 5E are schematic diagrams of an example in which coded data is dequantized and inverse-normalized in the decoding apparatus 400. Moreover, here, it is assumed that, as a plurality of input values serving as a unit of encoding in an input signal, two input values are supplied to the restricted-normalization unit 210.

In this example, input and output values are set to have a range from "−4.0" to "4.0", normalization coefficients are "4.0", "2.0", and "1.0", and quantization accuracy information is "1". That is, quantized values are "−1", "0", and "1". In the quantization unit 220, when a normalized value is "0.5" or higher, the quantized value is "1". When a normalized value is less than "0.5" and greater than "−0.5", the quantized value is "0". When a normalized value is "−0.5" or less, the quantized value is "−1". In the dequantization unit 440, quantized values are converted into real numbers.

FIG. 5A illustrates amplitude values A611 and B612 as the two input values serving as a unit of encoding. Here, the vertical axis represents the magnitude V of an amplitude value. Moreover, the vertical axis represents a value corresponding to a normalization coefficient N.

The amplitude values A611 and B612 are input values as information to be encoded, and are "1.8" and "−0.4", respectively. Here, the normalization coefficient (2.0) that is closest to the maximum value (1.8) of the absolute values of the two amplitude values A611 and B612 is selected by the restricted-normalization unit 210 as a normalization coefficient for normalizing the amplitude values A611 and B612. As another example of the selection of a normalization coefficient, the normalization coefficient (2.0) that is closest to the maximum value (1.8) may be selected by the restricted-normalization unit 210 from among normalization coefficients (2.0 and 4.0) that are larger than the maximum value (1.8).

Here, in the existing technology, there may be a case in which a normalization coefficient "4.0", which is larger than "2.0", is selected so as to cause the distribution of probability of occurrence of quantized values to have a large value near "0". In contrast, in an embodiment of the present invention, the normalization coefficient that is closest to the maximum value of the absolute values of a plurality of input values in an input signal or the normalization coefficient that is closest to the maximum value from among the normalization coefficients that are larger than the maximum value is selected.

FIG. 5B illustrates normalized values A621 and B622 and quantized values A631 and B632 calculated by the encoding apparatus 200. Here, the vertical axis represents the magnitude NV of a normalized value. Moreover, the vertical axis represents values corresponding to three quantized values.

The normalized values A621 and B622 are values obtained by dividing the amplitude values A611 and B612 by the normalization coefficient (2.0) selected by the restricted-normalization unit 210. The normalized values A621 and B622 represent "0.9" and "−0.2", respectively. Here, in a case in which the normalization coefficient that is closest to the maximum value of the absolute values of a plurality of input values is selected by the restricted-normalization unit 210, when a normalization coefficient that is smaller than the maximum value is selected, a range of normalized values exceeds the range from "−0.1" to "1.0". Thus, it is necessary to correct the normalized values so as to fall within the range from "−0.1" to "1.0". For example, when the normalized value A621 or B622 is larger than "1.0", the normalized values A621 or B622, which is larger than "1.0", is corrected to be treated as "1.0".

The quantized values A631 and B632 are values obtained by quantizing the normalized values A621 and B622 by using the quantization unit 220. The quantized values A631 and B632 represent "1" and "0", respectively.

FIG. 5C illustrates a table of combination 640, which is two-dimensional, representing whether each combination regarding the quantized values A631 and B632 has a symbol. Here, it is assumed that a combination of two quantized values A631 and B632 is encoded as one symbol.

A circle mark shown in the table of combination 640 denotes that a combination of the quantized values A631 and B632 exists as a symbol in the code table stored in the code-table storage units 230 and 430. That is, this means that a code is allocated to a combination of the quantized values A631 and B632 having the circle mark.

A cross mark shown in the table of combination 640 means that a combination of the quantized values A631 and B632 does not exit as a symbol in the code table stored in the code-table storage units 230 and 430. That is, this means that a code is not allocated to a combination of the quantized values A631 and B632 having the cross mark.

As described above, a code is not allocated to the quantized values A631 and B632 that are both "0", which are a plurality of quantized values whose probability of occurrence is significantly low, in the code table stored in the code-table storage units 230 and 430. That is, a code table in which a plurality of quantized values that are all zero are not included as a symbol is stored in the code-table storage units 230 and 430.

In this example, a circle mark is allocated to a combination in which the quantized value A631 is "1" and the quantized value B632 is "0" in the table of combination 640, and thus, the plurality of quantized values A631 and B632 are encoded. Then, the encoded quantized values A631 and B632 are decoded by the decoding apparatus 400 in accordance with the code table the same as that of encoding apparatus 200.

FIG. 5D illustrates quantized values A651 and B652 and normalized values A'661 and B'662 in the decoding apparatus 400. Here, the vertical axis represents the magnitude NV' of a normalized value. Moreover, the vertical axis represents values corresponding to three quantized values.

The quantized values A651 and B652 are values obtained as a result of decoding performed by the decoding unit 420 in accordance with the code table. The quantized values A651 and B652 represent "1" and "0", respectively. As described above, the values the same as the quantized values A631 and B632 generated by the encoding apparatus 200 are saved for the quantized values A651 and B652 obtained as a result of decoding performed by the decoding apparatus 400.

The normalized values A'661 and B'662 are values obtained by dequantizing the quantized values A651 and B652 by using the dequantization unit 440. The normalized values A'661 and B'662 represent "1.0" and "0.0", respectively.

FIG. 5E illustrates amplitude values A'671 and B'672 as two output values. Here, the vertical axis represents the magnitude V' of an amplitude value. Moreover, the vertical axis represents values corresponding to normalization coefficients N.

The amplitude values A'671 and B'672 are output values calculated by multiplying the normalized values A'661 and B'662 by a normalization coefficient (2.0) by using the inverse-normalization unit 450. The amplitude values A'671 and B'672 represent "2.0" and "0.0", respectively.

As described above, only the normalization coefficient that is closest to the maximum value of the absolute values of the amplitude values A611 and B612, which are a plurality of input values, can be selected from among three normalization coefficients by the restricted-normalization unit 210 installed. Thus, except for the case in which both of the amplitude values A611 and B612 are less than "0.5" and larger than "−0.5", either one of the quantized values becomes "1". As a result, the probability of occurrence of a plurality of quantized values in which both the quantized values are "0" can be reduced. Thus, the occurrence of an error due to the replacement of a plurality of quantized values that are all zero with a plurality of quantized values, which are different from the plurality of quantized values that are all zero, can be reduced.

Moreover, the probability of occurrence of a plurality of quantized values that are all "0" can be reduced more significantly than before by preventing a large normalization coefficient from being set on purpose, which was performed as necessary in the existing technology in order to increase the probability of occurrence of the quantized value "0". That is, the probability of occurrence of a plurality of quantized values that are all zero can be reduced by selecting the normalization coefficient that is closest to the maximum value of the absolute values of a plurality of input values or the normalization coefficient that is closest to the maximum value from among the normalization coefficients that are larger than the maximum value.

Here, even when both of the amplitude values A611 and B612 are less than "0.5" and greater than "−0.5", the quantized-value replacing unit 310 can replace a plurality of quantized values that are all "0" with a combination of a plurality of quantized values, which are different from the plurality of quantized values that are all "0". Thus, the symbol corresponding to a plurality of quantized values that are all "0" can be excluded from the code table. Here, the Huffman code table stored in the code-table storage units 230 and 430 will be described in the following with reference to FIGS. 6A and 6B.

Figures 6A, 6B:
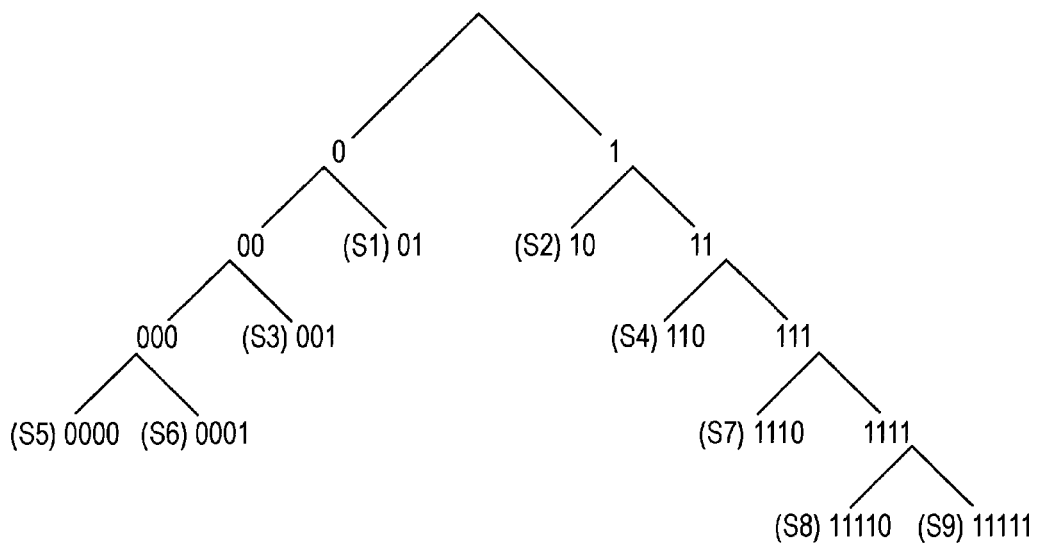
FIGS. 6A and 6B are diagrams regarding an existing Huffman code table.

FIGS. 6A and 6B are diagrams regarding an existing Huffman code table. FIG. 6A is a diagram of a table of combination 841 regarding quantized values A and B. In the table of combination 841, nine symbols S1 to S9 corresponding to combinations of the quantized values A and B are illustrated. In this example, the frequencies of occurrence corresponding to the probabilities of occurrence of the symbols S1 and S2 are "8", the frequencies of occurrence of the symbols S3 and S4 are "4", the frequencies of occurrence of the symbols S5 to S8 are "2", and the frequency of occurrence of the symbol S9 is "1".

FIG. 6B is a diagram of an example of a Huffman tree generated in accordance with the frequencies of occurrence of the symbols S1 to S9 described with reference to FIG. 6A. As illustrated in this Huffman tree, codes of a Huffman code "01", "10", "001", "110", "0000", "0001", "1110", "11110", and "11111" are allocated to the symbols S1 to S9, respectively.

FIG. 7 is a diagram regarding codes of the Huffman code generated under conditions described with reference to FIGS. 6A and 6B. Here, a code 843, a code length 844, and a frequency of occurrence 845 are illustrated for every symbol 842 illustrated in FIG. 6A. For example, a code 843, which is "01", is allocated to the symbol S1, which is one of symbols 842. The code length 844 of this code is "2" bits and the frequency of occurrence 845 thereof is "8".

In this example, the maximum code length is 5 bits. Moreover, the average code length is 2.88 (=(2×8×2+3×4×2+4×2×3+5×2×1+5×1×1)/(8×2+4×2+2×4+1×1)) bits. Here, this average code length is calculated by subtracting the sum of the frequencies of occurrence 845 from the sum of the products of the code lengths 844 and the frequencies of occurrence 845, each product being obtained by multiplying the code length 844 of one of the symbols 842 by the frequency of occurrence 845 of the symbol 842.

As described above, in Huffman coding, the smaller the frequency of occurrence of a symbol corresponding to the probability of occurrence, the longer the code length of a variable-length code allocated to the symbol. In general, since the frequency of occurrence of the symbol S9, which means that both of the quantized values A and B are "0", is significantly small, a long code length is allocated to the symbol S9. Thus, when an input signal such as a silent audio signal is input, the symbol S9, which means that both of the quantized values A and B are "0", is generated. As a result, the coding efficiency significantly decreases. In contrast to this, the code table stored in the code-table storage units 230 and 430 will be described in the following with reference to FIGS. 8A to 9.

Figures 8A, 8B:
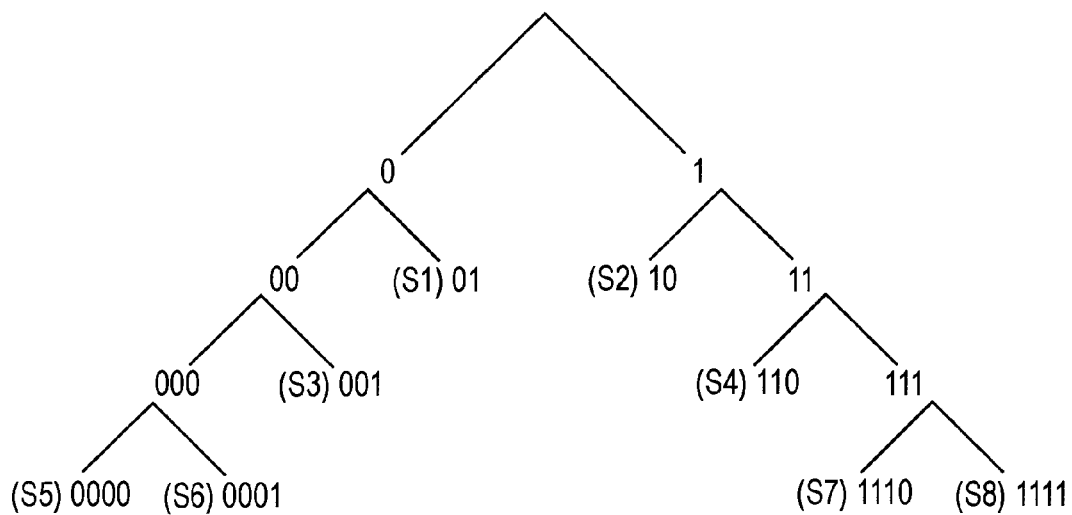
FIGS. 8A and 8B are diagrams regarding a code table stored in code-table storage units according to the first embodiment of the present invention.

FIGS. 8A and 8B are diagrams regarding the code table stored in the code-table storage units 230 and 430 according to the first embodiment of the present invention. FIG. 8A is a diagram of a table of combination 641 regarding the quantized values A and B. The table of combination 641 corresponds to the table of combination 640 illustrated in FIG. 5C. In the table of combination 641, eight symbols S1 to S8 corresponding to combinations of the quantized values A and B are illustrated. Here, the frequencies of occurrence of the symbols S1 and S2 are "8", the frequencies of occurrence of the symbols S3 and S4 are "4", and the frequencies of occurrence of the symbols S5 to S8 are "2".

FIG. 8B is a diagram of a Huffman tree generated in accordance with the frequencies of occurrence of the symbols S1 to S8 described with reference to FIG. 8A. As illustrated in this Huffman tree, codes of a Huffman code "01", "10", "001", "110", "0000", "0001", "1110", and "1111" are allocated to the symbols S1 to S8, respectively.

FIG. 9 is a diagram regarding the codes of the Huffman code generated under conditions described with reference to FIGS. 8A and 8B. Here, a code 643, a code length 644, and a frequency of occurrence 645 are illustrated for every symbol 642 illustrated in FIG. 8A. For example, a code 643, which is "01", is allocated to the symbol S1, which is one of symbols 642. The code length 644 of this code is "2" bits and the frequency of occurrence 645 thereof is "8". Moreover, combinations of a plurality of quantized values corresponding to the symbols 642 and codes 643 corresponding to the symbols 642 are illustrated in the code table stored in the code-table storage unit 230.

In this example, the maximum code length is 4 bits and is shorter than the maximum code length for the existing code table described with reference to FIG. 7. Moreover, the average code length is 2.75 (=(2×8×2+3×4×2+4×2×4)/(8×2+4×2+2×4)) bits and is shorter than the average code length for the existing code table.

As described above, the maximum code length and the average code length can be shortened by excluding a symbol whose quantized values A and B are both "0" from targets to be encoded. Thus, the coding efficiency can be increased. That is, a decrease in the coding efficiency can be suppressed by suppressing generation of a code whose code length is longest and that corresponds to a plurality of quantized values that are all zero.

Next, an operation of the information processing system 100 according to the first embodiment of the present invention will be described with reference to FIGS. 10 and 11.

Figure 10:
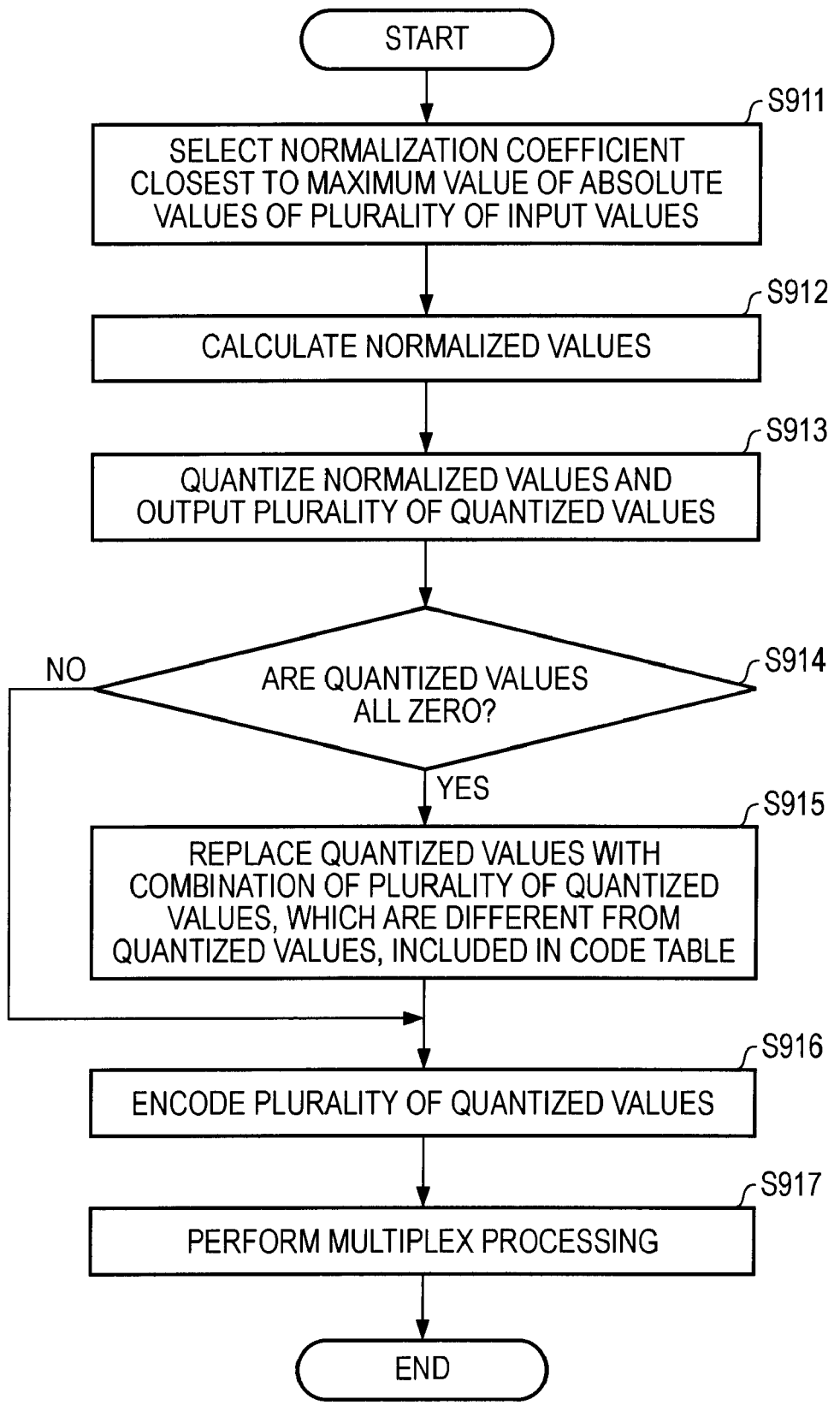
FIG. 10 is a flowchart illustrating an example of a processing procedure of an encoding method for the encoding apparatus according to the first embodiment of the present invention.

FIG. 10 is a flowchart illustrating an example of a processing procedure of an encoding method for the encoding apparatus 200 according to the first embodiment of the present invention. Here, it is assumed that the Huffman code table in which a plurality of quantized values that are all zero are excluded from targets to be encoded is stored in the code-table storage unit 230.

First, the restricted-normalization unit 210 selects, from among predetermined normalization coefficients, the normalization coefficient that is closest to the maximum value of the absolute values of a plurality of input values in an input signal (step S911). Here, the restricted-normalization unit 210 may select instead the normalization coefficient that is closest to the maximum value of the absolute values of the plurality of input values in the input signal from among the normalization coefficients that are larger than the maximum value.

Then, the restricted-normalization unit 210 calculates a plurality of normalized values by dividing the plurality of input values by the selected normalization coefficient (step S912). Here, the restricted-normalization unit 210 supplies the normalization coefficient to the multiplexing unit 240. Here, steps S911 and S912 are an example of a normalization process described in the claims.

Then, the quantization unit 220 generates a plurality of quantized values by quantizing the plurality of normalized values calculated by the restricted-normalization unit 210 in accordance with the quantization accuracy information (step S913). Here, the quantization unit 220 supplies the quantization accuracy information to the multiplexing unit 240. Here, step S913 is an example of a quantization process described in the claims.

Thereafter, the quantized-value replacing unit 310 determines whether the plurality of quantized values output from the quantization unit 220 are all zero (step S914). When the plurality of quantized values are not all zero, the quantized-value replacing unit 310 simply outputs the plurality of quantized values output from the quantization unit 220, to the encoding unit 320.

In contrast, when the plurality of quantized values are all zero, the quantized-value replacing unit 310 replaces the plurality of quantized values with one of combinations of a plurality of quantized values included in the code table stored in the code-table storage unit 230 (step S915). Here, every time the plurality of quantized values that are all zero are replaced with a plurality of quantized values illustrated in the code table stored in the code-table storage unit 230, the plurality of quantized values used in the current replacement may be made different from a plurality of quantized values used in the last replacement.

Next, the encoding unit 320 encodes the plurality of quantized values by outputting, in accordance with the code table, a code of the Huffman code corresponding to the plurality of quantized values output from the quantized-value replacing unit 310 (step S916). That is, when the plurality of quantized values are all zero, the code output unit 300 outputs a variable-length code, a code of the Huffman code, allocated to a combination of a plurality of quantized values, which are different from the plurality of quantized values, in accordance with the code table stored in the code-table storage unit 230.

Here, steps S914 to S916 are an example of a code output process described in the claims.

Then, the multiplexing unit 240 generates a code string by associating the code of the Huffman code supplied from the code output unit 300, the normalization coefficient supplied from the restricted-normalization unit 210, and the quantization accuracy information supplied from the quantization unit 220 with one another and multiplexing the code of the Huffman code supplied from the code output unit 300, the normalization coefficient supplied from the restricted-normalization unit 210, and the quantization accuracy information supplied from the quantization unit 220 (step S917). That is, the multiplexing unit 240 performs multiplex processing.

FIG. 11 is a flowchart illustrating a processing procedure of a decoding method for the decoding apparatus 400 according to the first embodiment of the present invention. Here, it is assumed that the code-table storage unit 430 stores a code table the same as that stored in the code-table storage unit 230 described with reference to FIG. 10.

First, the separation unit 410 separates the code string generated by the encoding apparatus 200 into the code of the Huffman code, which is encoded data, and the quantization accuracy information and normalization coefficient corresponding to the code of the Huffman code by performing separation processing (step S921). Then, the decoding unit 420 decodes the encoded data obtained as a result of the separation processing performed by the separation unit 410 into a plurality of quantized values by referring to the code table stored in the code-table storage unit 430 (step S922).

Thereafter, the dequantization unit 440 converts the plurality of quantized values obtained as a result of decoding performed by the decoding unit 420 into a plurality of normalized values by performing dequantization processing in accordance with the quantization accuracy information supplied from the separation unit 410 (step S923). Then, the inverse-normalization unit 450 generates a plurality of output values by performing inverse-normalization processing by using the plurality of normalized values obtained as a result of the conversion performed by the dequantization unit 440 and the normalization coefficient supplied from the separation unit 410 (step S924).

As described above, in the first embodiment of the present invention, when a plurality of quantized values are all zero, a code of the Huffman code corresponding to a combination of a plurality of quantized values, which are different from the above-described plurality of quantized values, can be output. Thus, the maximum code length and the average code length for the encoding apparatus 200 can be shortened, and the coding efficiency can be increased. Here, an error caused by replacing a plurality of quantized values that are all zero with a combination of a plurality of quantized values, which are different from the plurality of quantized values that are all zero, will be described in the following with reference to FIGS. 12A to 12E.

FIGS. 12A to 12E are schematic diagrams regarding an error due to the replacement of quantized values performed by the information processing system 100 according to the first embodiment of the present invention. Here, conditions under which the information processing system 100 is operated are the same as those described with reference to FIGS. 5A to 5E, and thus description thereof will be omitted.

FIG. 12A illustrates amplitude values A613 and B614 as input values supplied to the restricted-normalization unit 210. In this example, it is assumed that both of the amplitude values A613 and B614 are "0.0". Here, the restricted-normalization unit 210 calculates the absolute values of the differences between three normalization coefficients and the maximum value (0.0) of the absolute values of the two amplitude values A613 and B614. The restricted-normalization unit 210 selects a normalization coefficient (1.0) corresponding to the absolute value of a difference (1.0), which is the minimum value of these calculated absolute values of the differences. That is, the restricted-normalization unit 210 selects the normalization coefficient that is closest to the maximum value.

FIG. 12B illustrates normalized values A623 and B624 and quantized values A633 and B634 in the encoding apparatus 200. Both of the normalized values A623 and B624 represent "0.0". Both of the quantized values A633 and B634 are obtained by quantizing the normalized values A623 and B624 by using the quantization unit 220, and represent "0". Thus, the quantized-value replacing unit 310 replaces the quantized values A633 and B634 with a symbol corresponding to a combination in which the quantized value A633 is "−1" and the quantized value B634 is "0".

FIG. 12C illustrates the table of combination 641, which is two-dimensional, representing whether symbols corresponding to combinations of the quantized values A633 and B634 exist. The code (1110) illustrated in FIG. 9 is the code corresponding to the symbol S7, which is a symbol corresponding to the combination in which the quantized value A633 is "−1" and the quantized value B634 is "0", in the table of combination 641, and is output as encoded data. Then, the encoded data (1110) is decoded by the decoding apparatus 400 in accordance with the code table which is the same as that stored in the code-table storage unit 230 of the encoding apparatus 200.

FIG. 12D illustrates quantized values A'653 and B654 and normalized values A'663 and B'664 in the decoding apparatus 400. The quantized values A'653 and B654 are obtained by decoding the encoded data by using the decoding unit 420, and represent "−1" and "0", respectively. Here, the quantized value A'653 obtained by performing decoding by using the decoding apparatus 400 has an error e1 of "−1" due to the replacement performed by the quantized-value replacing unit 310.

Moreover, the normalized values A'663 and B'664 are obtained by dequantizing the quantized values A'653 and B654, respectively, by using the dequantization unit 440. The normalized values A'663 and B'664 represent "1.0" and "0.0", respectively.

FIG. 12E illustrates amplitude values A'673 and B'674 as output values. The amplitude values A'673 and B'674 are obtained by multiplying the normalized values A'663 and B'664 by the normalization coefficient (1.0) by using the inverse-normalization unit 450. The amplitude values A'673 and B'674 represent "1.0" and "0.0", respectively. Here, the amplitude value A'673 has an error e2 of "−1.0" due to the replacement performed by the quantized-value replacing unit 310.

As described above, when both of the amplitude values A613 and B614 are less than "0.5" and greater than "−0.5", both of the quantized values A633 and B634 become "0". As a result, the quantized-value replacing unit 310 replaces the quantized values A633 and B634 with a combination of the quantized values A'653 and B654, which are different from the quantized values A633 and B634. Thus, the amplitude value A'673, which is an output value, has the error e2 as described above.

In this example, since a plurality of quantized values, only one of which is nonzero and is "−1", is used for the replacement from among combinations of a plurality of quantized values included in the code table, only the amplitude value A'673, which is an output value, has the error e2. Thus, when a plurality of quantized values are all zero, the number of output values that have the error e2 can be minimized by outputting a variable-length code corresponding to a plurality of quantized values, only one of which is nonzero, by using the code output unit 300 in accordance with the code table. As a result, the amount of errors which a plurality of output values have and which are due to the replacement of a plurality of quantized values can be reduced.

Here, for example, when an input signal whose signal level is low such as a silent audio signal is input to the encoding apparatus 200, both of the amplitude values A613 and B614 become less than "0.5" and greater than "−0.5". Thus, even when an output value is slightly increased by the error e2, this does not greatly affect the result. However, there may be a case in which the error e2 due to the replacement of a plurality of quantized values by using the quantized-value replacing unit 310 affects the resulting sound acoustically. In contrast to this, a second embodiment is an improved embodiment in which the error e2 is reduced.

2. Second Embodiment

FIGS. 13A to 13E are schematic diagrams regarding an error due to the replacement of a plurality of quantized values performed by the information processing system 100 according to the second embodiment of the present invention. Here, the basic structure of the encoding apparatus 200 in the information processing system 100 is similar to that of the encoding apparatus 200 illustrated in FIG. 2. Moreover, the structure of the decoding apparatus 400 in the information processing system 100 according to the second embodiment of the present invention is also similar to that of the decoding apparatus 400 illustrated in FIG. 4.

In this example, a case is assumed in which a normalization coefficient may be selected by the restricted-normalization unit 210 from among "0.50" and "0.25" in addition to "4.00", "2.00" and "1.00" illustrated in FIG. 5A. Other conditions under which operation is performed are similar to those described with reference to FIGS. 5A to 5E, and thus description thereof will be omitted. Moreover, FIGS. 13B to 13D are similar to FIGS. 12B to 12D, and thus description thereof will be omitted.

Similarly to FIG. 12A, FIG. 13A illustrates the amplitude values A613 and B614 as input values. Both of the amplitude values A613 and B614 represent "0.00". Here, the restricted-normalization unit 210 selects the normalization coefficient (0.25) that is closest to the maximum value (0.00) of the absolute values of the two amplitude values A613 and B614, as a normalization coefficient for normalizing the amplitude values A613 and B614.

FIG. 13E illustrates amplitude values A'773 and B'774 as output values. The amplitude values A'773 and B'774 are obtained by multiplying the normalized values A'663 and B'664 by the normalization coefficient (0.25) by using the inverse-normalization unit 450, and represent "0.25" and "0.00", respectively. In this example, the amplitude value A'773 has an error e3 of "−0.25" due to replacement of a plurality of quantized valued that are all zero by using the quantized-value replacing unit 310.

As described above, when the magnitude of the minimum normalization coefficient is reduced from "1.00" to "0.25", the number of normalization coefficients increases. Thus, there may be a case in which the number of allocated bits for transmitting a normalization coefficient to the decoding apparatus 400 is increased and the amount of information to be transmitted is increased. However, the error e3 according to the second embodiment can be more greatly reduced than the error e2 illustrated in FIG. 12E by reducing the magnitude of the minimum normalization coefficient in the restricted-normalization unit 210. That is, in the second embodiment of the present invention, the amount of information to be transmitted is increased by performing division on a plurality of input values by using the normalization coefficients whose minimum normalization coefficient is set to close to zero; however, an error due to the replacement of a plurality of quantized values that are all zero can be reduced.

3. Third Embodiment

Next, a Huffman-code generation apparatus 500 will be described, which generates, in advance, a Huffman code table used in encoding and decoding processing performed by the information processing system 100 according to the first and second embodiments of the present invention. It is assumed that the Huffman-code generation apparatus 500 performs processing, which is performed by the encoding apparatus 200 in the first and second embodiments of the present invention, and includes a structure similar to the restricted-normalization unit 210, quantization unit 220, and quantized-value replacing unit 310 included in the encoding apparatus 200. Here, the structure of the Huffman-code generation apparatus 500 will be described in the following with reference to FIG. 14.

Figure 14:
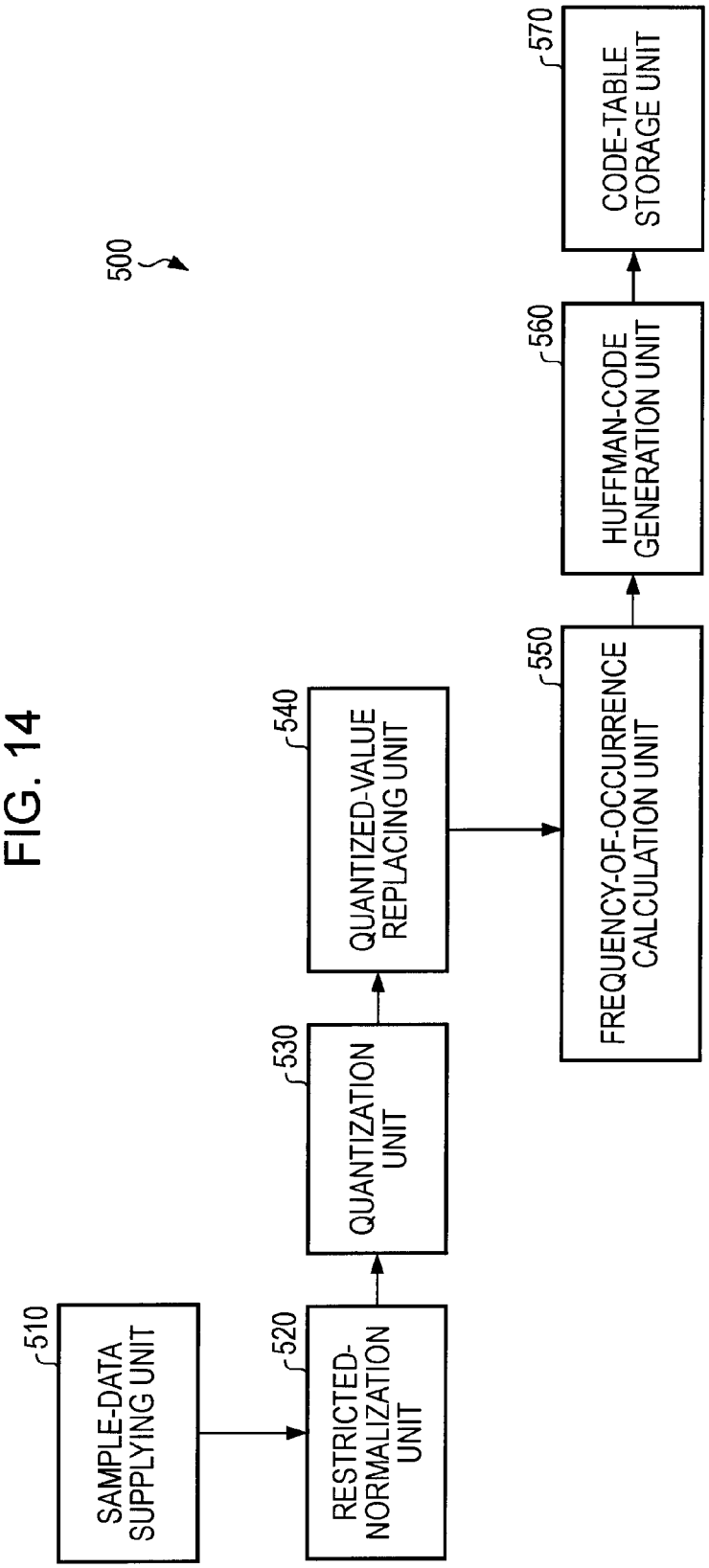
FIG. 14 is a block diagram of an example of the structure of a Huffman-code generation apparatus according to a third embodiment of the present invention.

FIG. 14 is a block diagram of an example of the structure of the Huffman-code generation apparatus 500 according to a third embodiment of the present invention. The Huffman-code generation apparatus 500 includes a sample-data supplying unit 510, a restricted-normalization unit 520, a quantization unit 530, a quantized-value replacing unit 540, a frequency-of-occurrence calculation unit 550, a Huffman-code generation unit 560, and a code-table storage unit 570. The restricted-normalization unit 520, the quantization unit 530, and the quantized-value replacing unit 540 are similar to the restricted-normalization unit 210, the quantization unit 220, and the quantized-value replacing unit 310 illustrated in FIG. 2. Accordingly, description thereof will be omitted.

The sample-data supplying unit 510 supplies sample data for generating a Huffman code table. The sample-data supplying unit 510 supplies sample data, which is assumed to be an input signal to be encoded by the encoding apparatus 200, to the restricted-normalization unit 520.

For each of symbols, which are combinations of a plurality of quantized values, output from the quantized-value replacing unit 540, the frequency-of-occurrence calculation unit 550 calculates a frequency of occurrence. The frequency-of-occurrence calculation unit 550 obtains "0" as the calculated frequency of occurrence of a plurality of quantized values that are all zero since the quantized-value replacing unit 540 replaces the plurality of quantized values that are all zero with a combination of a plurality of quantized values, which are different from the plurality of quantized values that are all zero. The frequency-of-occurrence calculation unit 550 supplies the calculated frequencies of occurrence to the Huffman-code generation unit 560.

The Huffman-code generation unit 560 generates codes of a Huffman code in accordance with the frequencies of occurrence for the symbols supplied from the frequency-of-occurrence calculation unit 550. The smaller the frequency of occurrence of a symbol, the longer the code length of a code of the Huffman code allocated to the symbol by the Huffman-code generation unit 560. Moreover, the Huffman-code generation unit 560 supplies, as the Huffman code table, the codes of the Huffman code allocated to the symbols to the code-table storage unit 570.

The code-table storage unit 570 stores the Huffman code table supplied from the Huffman-code generation unit 560. The Huffman code table stored in the code-table storage unit 570 is transferred to the code-table storage unit 230 included in the encoding apparatus 200 and the code-table storage unit 430 included in the decoding apparatus 400.

As described above, a plurality of quantized values that are all zero can be replaced with a combination of a plurality of quantized values, which are different from the plurality of quantized values that are all zero, by the quantized-value replacing unit 540 installed. Thus, the symbol corresponding to a plurality of quantized values that are all zero can be excluded from the code table. Next, an example of an operation of the Huffman-code generation apparatus 500 will be described in the following with reference to FIG. 15.

Figure 15:
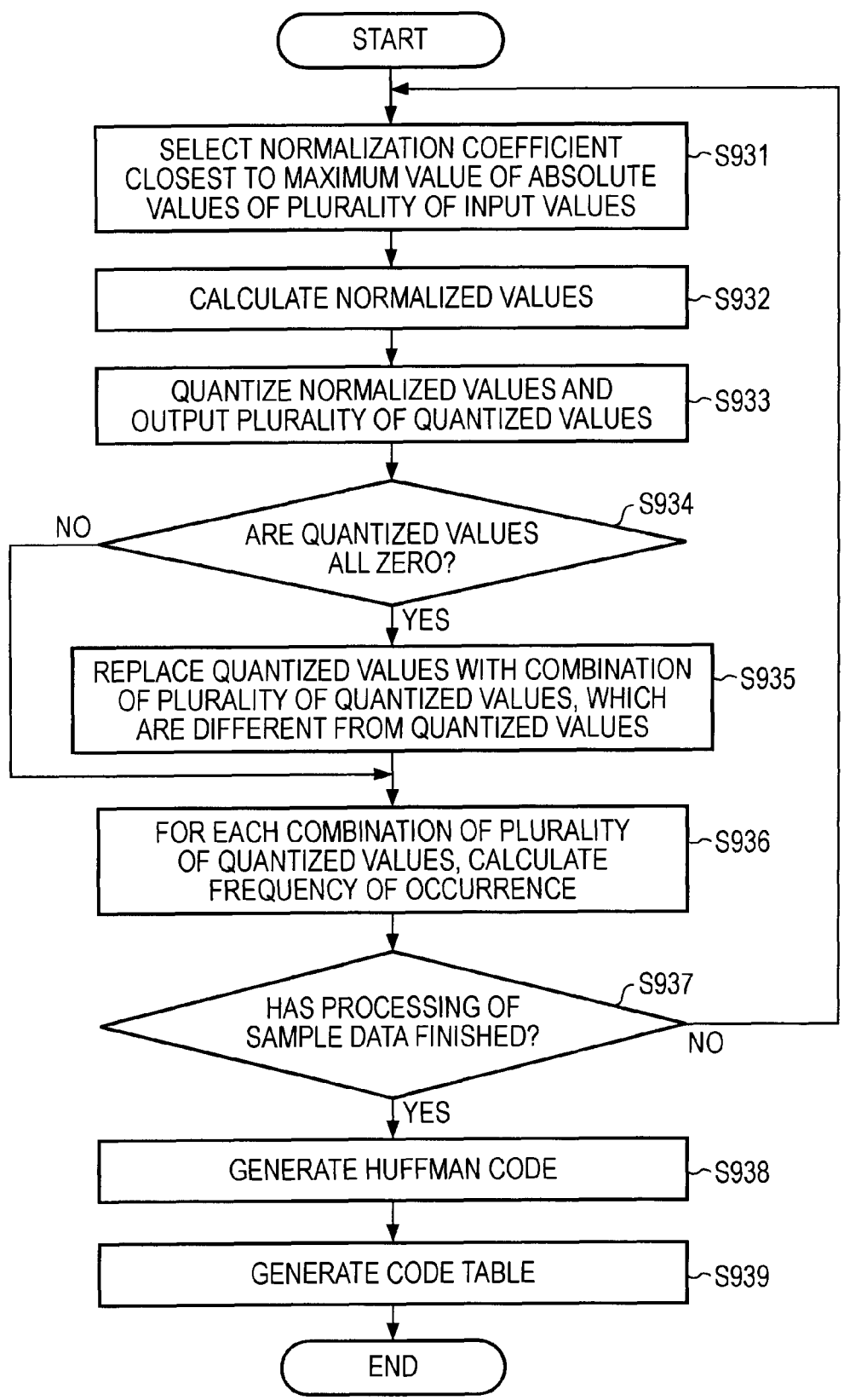
FIG. 15 is a flowchart illustrating an example of a processing procedure of a code generation method for the Huffman-code generation apparatus according to the third embodiment of the present invention.

FIG. 15 is a flowchart illustrating an example of a processing procedure of a code generation method for the Huffman-code generation apparatus 500 according to the third embodiment of the present invention.

First, the restricted-normalization unit 520 selects a normalization coefficient from among a plurality of normalization coefficients, the absolute value of the difference between the normalization coefficient and the maximum value of the absolute values of a plurality of input values supplied from the sample-data supplying unit 510 being smallest (step S931). Then, the restricted-normalization unit 520 calculates a plurality of normalized values by dividing the plurality of input values by the selected normalization coefficient (step S932). Then, the quantization unit 530 generates a plurality of quantized values by quantizing the plurality of normalized values calculated by the restricted-normalization unit 520 in accordance with the quantization accuracy information (step S933).

Thereafter, the quantized-value replacing unit 540 determines whether the plurality of quantized values output from the quantization unit 530 are all zero (step S934). When the plurality of quantized values are not all zero, the quantized-value replacing unit 540 simply outputs the plurality of quantized values supplied from the quantization unit 220 to the encoding unit 320. In contrast, when the plurality of quantized values are all zero, the quantized-value replacing unit 540 replaces the plurality of quantized values with a combination of a plurality of quantized values, which are different from the plurality of quantized values, (step S935).

Then, the frequency-of-occurrence calculation unit 550 calculates the frequency of occurrence for the plurality of quantized values or the combination of a plurality of quantized values supplied from the quantized-value replacing unit 540 (step S936). In this way, steps S931 to S936 are repeatedly performed until processing of the sample data supplied from the sample-data supplying unit 510 has finished. Moreover, when processing of the sample data supplied from the sample-data supplying unit 510 is finished (step S937), the Huffman-code generation unit 560 generates codes of the Huffman code, each of which is generated in accordance with the frequency of occurrence of a corresponding one of combinations of a plurality of quantized values (step S938). Then, the Huffman-code generation unit 560 generates a Huffman code table by using the generated codes, and the code-table storage unit 570 stores the Huffman code table (step S939).

As described above, a code table that does not include the symbol corresponding to the plurality of quantized values that are all zero can be generated by replacing a plurality of quantized values that are all zero with a combination of a plurality of quantized values, which are different from the plurality of quantized values that are all zero, in the third embodiment of the present invention.

Hence, according to the embodiments of the present invention, the maximum code length and the average code length can be shortened by excluding a plurality of quantized values that are all zero from the targets to be encoded.

Here, in the embodiments of the present invention, an audio signal is used as an example of the input signal input to the information processing system 100; however, an image signal may be input to the information processing system 100 as an input signal.

Moreover, in the embodiments of the present invention, the example in which the Huffman code table is stored in the code-table storage unit 230 of the encoding apparatus 200 has been described; however, the encoding apparatus 200 may be provided with the Huffman-code generation apparatus 500. For example, the encoding apparatus 200 may be further provided with the quantized-value replacing unit 540, the frequency-of-occurrence calculation unit 550, and the Huffman-code generation unit 560.

Note that the embodiments of the present invention are examples for realizing the present invention, and as clearly described in the embodiments of the present invention, there is a correspondence relationship between each of the items described in the embodiments of the present invention and a corresponding one of elements used to define inventions described in the claims. Similarly, there is a correspondence relationship between each of the elements used to define inventions described in the claims and a corresponding one of the items having the same name as the element. However, the present invention is not limited to the embodiments, and the present invention may be realized by embodiments on which various modifications have been made without departing from the gist of the present invention.

Moreover, the processing procedures described in the embodiments of the present invention may be treated as methods, each of which has a corresponding one of the processing procedures, or may be treated as programs, each of which is used to execute a corresponding one of the processing procedures. The programs may be stored in a recording medium. As such a recording medium, for example, a compact disc (CD), a MiniDisc (MD), a digital versatile disc (DVD), a memory card, a Blu-ray Disc (registered trademark), and the like can be used.

The present application contains subject matter related to that disclosed in Japanese Priority Patent Application JP 2009-234692 filed in the Japan Patent Office on Oct. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding apparatus comprising:
    a normalization unit that calculates a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value;
    a quantization unit that generates a plurality of quantized values by quantizing the plurality of normalized values;
    a code-table storage unit that stores a code table in which the smaller the probability of occurrence of the plurality of quantized values, the longer the code length of a variable-length code allocated to the plurality of quantized values; and
    a code output unit that outputs, when the plurality of quantized values are all zero, a variable-length code allocated to a combination of a plurality of quantized values, which are different from the plurality of the quantized values, in accordance with the code table.

2. The encoding apparatus according to claim 1, wherein when the plurality of quantized values are all zero, the code output unit outputs, in accordance with the code table, a variable-length code corresponding to a plurality of quantized values in which only one quantized value is nonzero, from among combinations of a plurality of quantized values included in the code table.

3. The encoding apparatus according to claim 1, wherein the code output unit includes
    a quantized-value replacing unit that selects, when the plurality of quantized values are all zero, one of combinations of a plurality of quantized values included in the code table and replaces the plurality of quantized values with the selected combination of a plurality of quantized values, and
    an encoding unit that encodes the plurality of quantized values output from the quantized-value replacing unit by generating the variable-length code in accordance with the code table.

4. The encoding apparatus according to claim 1, wherein the code-table storage unit stores a Huffman code table as the code table.

5. The encoding apparatus according to claim 1, wherein the normalization unit performs division on the plurality of input values by using the normalization coefficients including a normalization coefficient that is close to zero.

6. A decoding apparatus comprising:
    a code-table storage unit that stores a code table in which a variable-length code corresponding to a plurality of quantized values that are all zero is not included;
    a decoding unit that decodes a variable-length code into the plurality of quantized values in accordance with the code table generated in accordance with the probability of occurrence of the plurality of quantized values; and
    an inverse-normalization unit that generates a plurality of output values, as a plurality of input values in an input signal, by using a plurality of normalized values generated by dequantizing the plurality of quantized values obtained as a result of decoding performed by the decoding unit and a normalization coefficient corresponding to the plurality of normalized values.

7. An information processing system comprising:
    an encoding apparatus that includes
        a normalization unit that calculates a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value,
        a quantization unit that generates a plurality of quantized values by quantizing the plurality of normalized values,
        a code-table storage unit that stores a code table in which the smaller the probability of occurrence of the plurality of quantized values, the longer the code length of a variable-length code allocated to the plurality of quantized values, and
        a code output unit that outputs, when the plurality of the quantized values are all zero, a variable-length code allocated to a combination of a plurality of quantized values, which are different from the plurality of quantized values, in accordance with the code table; and a decoding apparatus that includes
    a code-table storage unit that stores a code table the same as that stored in the encoding apparatus,
    a decoding unit that decodes the variable-length code output from the encoding apparatus into the plurality of quantized values in accordance with the code table, and
    an inverse-normalization unit that generates a plurality of output values, as the plurality of input values, by using a plurality of normalized values generated by dequantizing the plurality of quantized values obtained as a result of decoding performed by the decoding unit and the normalization coefficient corresponding to the plurality of normalized values.

8. The information processing system according to claim 7, wherein only one quantized value of the plurality of quantized values is nonzero.

9. The information processing system according to claim 7, wherein the code output unit includes
    a quantized-value replacing unit that selects, when the plurality of quantized values are all zero, one of combinations of a plurality of quantized values included in the code table and replaces the plurality of quantized values with the selected combination of a plurality of quantized values, and
    an encoding unit that encodes the plurality of quantized values output from the quantized-value replacing unit by generating the variable-length code in accordance with the code table.

10. The information processing system according to claim 7, wherein the code-table storage unit stores a Huffman code table as the code table.

11. The information processing system according to claim 7, wherein the normalization unit performs division on the plurality of input values by using the normalization coefficients including a normalization coefficient that is close to zero.

12. An encoding apparatus comprising:
    a processor;
    a memory coupled to the processor, the memory including instructions which, when executed by the processor, perform an encoding method, the method comprising:
        calculating a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value;
        generating a plurality of quantized values by quantizing the plurality of normalized values; and
        outputting, when the plurality of quantized values are all zero, a variable-length code allocated to a combination of a plurality of quantized values, which are different from the plurality of quantized values, in accordance with a code table in which the smaller the probability of occurrence of a plurality of quantized values, the longer the code length of a variable length code allocated to the plurality of quantized values.

13. The encoding apparatus according to claim 12, the encoding method further comprising storing the code table.

14. The encoding apparatus according to claim 12, wherein only one quantized value of the plurality of quantized values is nonzero.

15. A non-transitory computer-readable storage medium encoded with instructions that, when executed on a processor, perform a method, the method comprising:
    calculating a plurality of normalized values by dividing a plurality of input values in an input signal by either a normalization coefficient that is closest to a maximum value of absolute values of the plurality of input values or a normalization coefficient that is closest to the maximum value from among normalization coefficients that are larger than the maximum value;
    generating a plurality of quantized values by quantizing the plurality of normalized values; and
    outputting, when the plurality of quantized values are all zero, a variable-length code allocated to a combination of a plurality of quantized values, which are different from the plurality of quantized values, in accordance with a code table in which the smaller the probability of occurrence of a plurality of quantized values, the longer the code length of a variable length code allocated to the plurality of quantized values.

16. The non-transitory computer-readable storage medium according to claim 15, the method further comprising storing the code table.

17. The non-transitory computer-readable storage medium according to claim 15, wherein only one quantized value of the plurality of quantized values is nonzero.

18. The non-transitory computer-readable storage medium according to claim 15, the method further comprising:
    selecting, when the plurality of quantized values are all zero, one of combinations of a plurality of quantized values included in the code table and replaces the plurality of quantized values with the selected combination of a plurality of quantized values; and
    encoding the plurality of quantized values output from the quantized-value replacing unit by generating the variable-length code in accordance with the code table.

19. The non-transitory computer-readable storage medium according to claim 15, wherein the code table is a Huffman code table.

20. The non-transitory computer-readable storage medium according to claim 15, wherein the normalization coefficient is close to zero.

* * * * *